US012391142B2

(12) United States Patent
Chaykowsky et al.

(10) Patent No.: US 12,391,142 B2
(45) Date of Patent: Aug. 19, 2025

(54) REDISTRIBUTING ENERGY CONSUMPTION BY ELECTRIC VEHICLES

(71) Applicant: Rivian IP Holdings, LLC, Irvine, CA (US)

(72) Inventors: John Michael Joseph Chaykowsky, Los Angeles, CA (US); Adam J. Mandel-Senft, San Leandro, CA (US)

(73) Assignee: Rivian IP Holdings, LLC

( * ) Notice: Subject to any disclaimer, the term of this patent is extended or adjusted under 35 U.S.C. 154(b) by 754 days.

(21) Appl. No.: 17/729,668

(22) Filed: Apr. 26, 2022

(65) Prior Publication Data
US 2023/0339357 A1 Oct. 26, 2023

(51) Int. Cl.
*B60L 53/67* (2019.01)
*B60L 53/30* (2019.01)
*B60L 53/62* (2019.01)
*B60L 53/63* (2019.01)
*B60L 53/68* (2019.01)
*B60L 58/12* (2019.01)

(52) U.S. Cl.
CPC ............ *B60L 53/67* (2019.02); *B60L 53/305* (2019.02); *B60L 53/62* (2019.02); *B60L 53/63* (2019.02); *B60L 53/68* (2019.02); *B60L 58/12* (2019.02)

(58) Field of Classification Search
CPC .......... B60L 53/67; B60L 53/68; B60L 53/62; B60L 58/12
See application file for complete search history.

(56) References Cited

U.S. PATENT DOCUMENTS

2020/0376972 A1* 12/2020 Martin .................... B60L 53/57

OTHER PUBLICATIONS

Lin, A. (2012). "Solving hard problems in election systems", Thesis, Rochester Institute of Technology, RIT Scholar Works, located at: https://scholarworks.rit.edu/theses/329.
Zhang, J., et al. (2011). "Heuristic Algorithms for Balanced Multi-way Number Partitioning", Proceedings of the Twenty-Second International Joint Conference on Artificial Intelligence, JCA 2011, Barcelona, Catalonia, Spain, Jul. 16-22, 2011, 693-698. Research Collection School of Computing and Information Systems. Available at: https://ink.library.smu.edu.sg/sis_research/1359.

* cited by examiner

*Primary Examiner* — Robert Grant
(74) *Attorney, Agent, or Firm* — FOLEY & LARDNER LLP

(57) ABSTRACT

Systems and methods for charging an electric vehicle fleet are disclosed. In some embodiments, a system for charging the electric vehicle fleet comprises a plurality of power dispensers, and a method for charging the electric vehicle fleet comprises assigning each vehicle to be charged to a power dispenser. In some embodiments, a demand for each electric vehicle is determined based on vehicle status information received from the vehicles. In some embodiments, a first set of demands and a second set of demands are determined based on the demands of the electric vehicles, and the vehicles are assigned to power dispensers based on the first and second sets of demands.

19 Claims, 12 Drawing Sheets

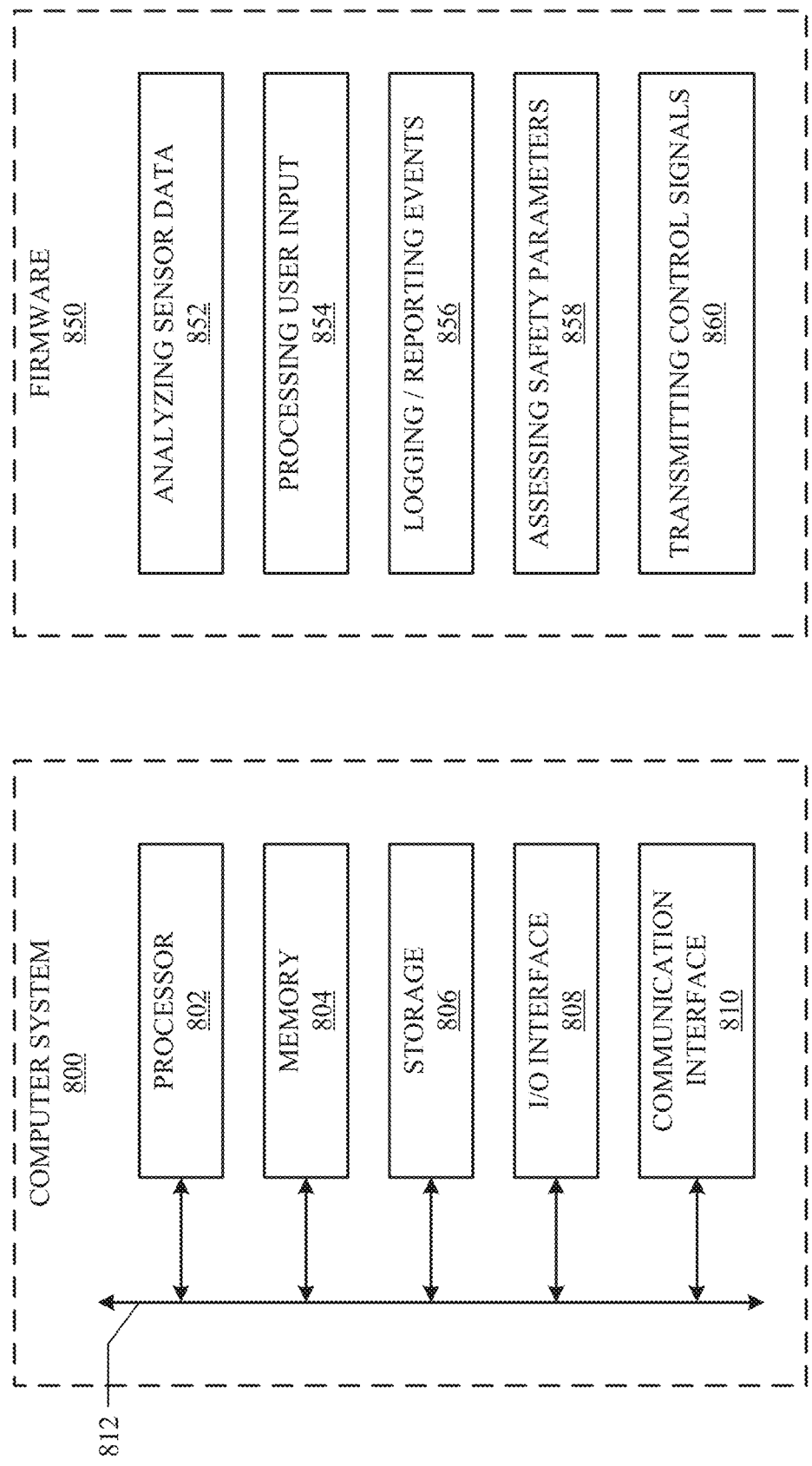

REDISTRIBUTING ENERGY CONSUMPTION BY ELECTRIC VEHICLES

INTRODUCTION

Effective management of a vehicle fleet (e.g., a fleet of delivery vehicles) may be important to the success of an organization that relies on the fleet for its operations. Management of a fleet may be more complicated for an electric vehicle fleet because a vehicle may not be deployed for its duties while charging or waiting to charge. Electric vehicles may have different energy demands, and chargers may have different output capabilities. Randomly assigning vehicles to chargers may result in a charger with a low output charging a vehicle with a large demand, delaying the vehicle and other queuing vehicles' return to operation. In some instances, random vehicle assignments may cause an energy consumption spike, resulting in high energy costs.

BRIEF SUMMARY

Systems and methods for charging an electric vehicle fleet are disclosed. In some embodiments, the systems and methods allow a fleet of electric vehicle to be more efficiently charged, allowing the electric vehicles to return to operation on schedule and minimizing energy costs. In some embodiments, a system for charging the electric vehicle fleet comprises a plurality of power dispensers, and a method for charging the electric vehicle fleet comprises assigning each vehicle to be charged to a power dispenser. In some embodiments, a demand (e.g., a specified quantity of electric energy for charging one or more batteries corresponding to a vehicle) for each electric vehicle is determined based on vehicle status information received from the vehicles. In some embodiments, a first set of demands and a second set of demands are determined based on the demands of the electric vehicles, and the vehicles are assigned to power dispensers based on the first and second sets of demands. Charging vehicles in this manner may allow the electric vehicles to return to operation on schedule and minimize energy costs.

The embodiments disclosed above are examples, and the scope of this disclosure is not limited to them. Particular embodiments may include all, some, or none of the components, elements, features, functions, operations, or steps of the embodiments disclosed above. Embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 8A is a schematic of an example computer system.

FIG. 8B illustrates example firmware for a vehicle ECU.

DESCRIPTION OF EXAMPLE EMBODIMENTS

Systems and methods for charging an electric vehicle fleet are disclosed. In some embodiments, the systems and methods allow a fleet of electric vehicle to be more efficiently charged, allowing the electric vehicles to return to operation on schedule and minimizing energy costs. In some embodiments, a system for charging the electric vehicle fleet comprises a plurality of power dispensers, and a method for charging the electric vehicle fleet comprises assigning each vehicle to be charged to a power dispenser. In some embodiments, a demand (e.g., a specified quantity of electric energy for charging one or more batteries corresponding to a vehicle) for each electric vehicle is determined based on vehicle status information received from the vehicles. In some embodiments, a first set of demands and a second set of demands are determined based on the demands of the electric vehicles, and the vehicles are assigned to power dispensers based on the first and second sets of demands. Charging vehicles in this manner may allow the electric vehicles to return to operation on schedule (e.g., such that no particular vehicle is a bottleneck for charging the fleet of vehicles) and minimize energy costs (e.g., the disclosed system prevents energy consumption spikes).

Figure 1:
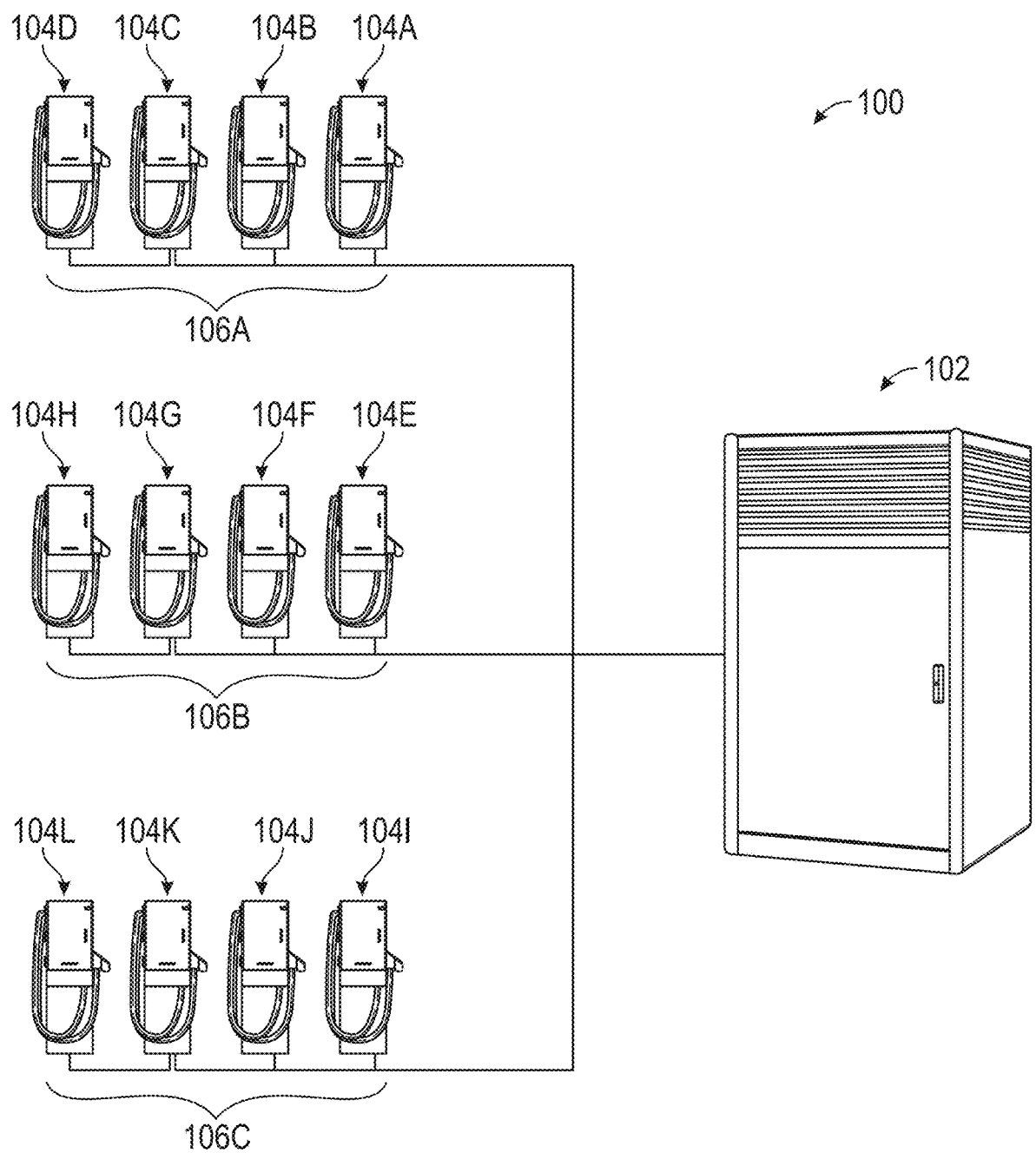
FIG. 1 illustrates an overview of an example system for charging an electric vehicle fleet.

FIG. 1 illustrates an overview of an example system 100 for charging an electric vehicle fleet. In some embodiments, as illustrated, the vehicle charging system 100 comprises a power cabinet 102, and the power cabinet is configured to provide energy to power dispensers for charging electric vehicles (e.g., via a charging cable, via wireless charging). For example, as illustrated, the power cabinet 102 is configured to provide energy to power dispensers 104A-104L. In some embodiments, some connections of the power dispensers to the power cabinet are organized in chains. For example, power dispensers 104A-104D are part of chain 106A, power dispensers 104E-104H are part of chain 106B, and power dispensers 1041-104L are part of chain 106C. In some embodiments, some connections of the power dispensers to the power cabinet are not organized in chains. For example, some of the power dispensers are directly connected to the power cabinet 102, and these power dispensers are not connected to another power dispenser.

In some embodiments, the power dispensers are daisy-chained, meaning energy is provided to a chain of power dispenser in a sequential manner. For example, energy may be provided to a first power dispenser of a chain (e.g., a power dispenser closest in proximity (e.g., in terms of electrical connection) from the power cabinet (e.g., power dispenser 104A of chain 106A)). After the first power dispenser ceases receiving energy (e.g., a vehicle finishes charging using the first power dispenser) from the power cabinet, energy is provided to a second power dispenser of the chain (e.g., a power dispenser second closest in proximity (e.g., in terms of electrical connection) to the power cabinet (e.g., power dispenser 104B of chain 106A), and so on). In some embodiments, a first power dispenser of a chain is configured for a highest charging output of the chain. For example, the power dispenser 104A is configured for a higher output than each of the power dispensers 104B-104D. In some embodiments, some power dispensers are not organized in chains, and these power dispensers are configured to receive energy at a same time from a power cabinet.

In some embodiments, one or more of the power dispensers 104A-104L comprises a direct current (DC) electric vehicle charger. For example, a first chain 106A of power dispensers comprises DC electric vehicle chargers (e.g., power dispensers 104A-104D are DC electric vehicle chargers). In some embodiments, one or more of the power dispensers 104A-104L comprises an alternate current (AC) electric vehicle charger. For example, a second chain 106B of power dispensers comprises AC electric vehicle chargers (e.g., power dispensers 104E-104H are AC electric vehicle chargers). An AC charger may be configured to provide a lower power output compared to a DC charger. As described in more detail below, the systems and methods disclosed herein advantageously allow the chains to have similar charging times and/or vehicle-charging priority to be satisfied, while accounting for different charger power output capabilities.

In some embodiments, daisy-chaining the power dispenser advantageously improves an efficiency of the power cabinet. For example, daisy-chaining allow the power dispenser to provide energy to more vehicles at a lower energy cost, compared to providing power directly to each power dispenser. In some instances, to take advantage of the chained charger configuration, effective management of vehicle charging may be important because a vehicle may not be deployed for its duties while charging or waiting to charge. Randomly assigning vehicles to chargers may result in a charger with a low output charging a vehicle with a large demand (e.g., the high demand vehicle is charging near an end of a chain), delaying the vehicle and other queuing vehicles' return to operation. In some instances, random vehicle assignments may cause an energy consumption spike, resulting in high energy costs (e.g., high demand vehicles are all charging at a same chain). In addition, the proposed solution provides charging efficiencies that can help improve the operational life of both the vehicle batteries and power dispensers.

In some embodiments, the vehicle charging system 100 and the operation of vehicle charging system 100 allow a fleet of electric vehicle to be more efficiently charged while taking advantage of the chained charger configuration. The vehicle charging system 100 may charge the plurality of electric vehicles according to the vehicles' demands, and the demands may be determined (e.g., by a respective vehicle, by the vehicle charging system 100, the server 220, the electronic device 230) based on the vehicles' status information. Based on the vehicles' demands, the vehicle charging system 100, the server 220, and/or the electronic device 230 determine electric vehicle assignments to allow the electric vehicles to return to operation on schedule and minimize energy costs.

In some embodiments, vehicle status information are received (e.g., by the vehicle charging system 100, by the server 220, by the electronic device 230) from a plurality of electric vehicles (e.g., transmitted from the electric vehicles, transmitted from an electronic device associated with the electric vehicles). In some embodiments, the vehicle status information includes a current state of charge for each of the plurality of electric vehicles. The vehicle status information of the plurality of electric vehicles may be received at different times (e.g., when a vehicle returns to the charging station, when a vehicle is ready for charging).

In some embodiments, demands of the plurality of electric vehicles are determined (e.g., by a vehicle associated with the vehicle status information, by the vehicle charging system 100, by the server 220, by the electronic device 230). For example, the determination of demands of the electric vehicles based on the vehicle status information may be performed by the server 220, by the vehicle associated with the vehicle status information, or via an application (installed on electronic device 230) provided by the server 220 to another party.

As an example, a current state of charge of the vehicle, the vehicle's route (e.g., received from an operator or manager of the vehicle fleet), and/or route information (e.g., elevation changes, traffic information) are received. The demand of the vehicle may be determined based on these information.

In some embodiments, each demand represents a specified quantity of electric energy to charge one or more batteries of a corresponding electric vehicle. For example, the demand represents a remaining charge of the one or more batteries (e.g., lower remaining charge corresponds to a higher demand). As another example, the demand represents a condition of the one or more batteries (e.g., lower battery health or an older battery (e.g., nominal battery capacity is greater than actual battery capacity) corresponds to a lower demand (e.g., assigned to lower power chargers), a battery configured to charge at higher power (e.g., 150+kW) or faster (e.g., based on an identified battery chemistry) corresponds to a higher demand, a battery configured to charge at lower power (e.g., 50 kW) or slower (e.g., based on an identified battery chemistry) corresponds to a lower demand, a battery configured to be charged by a DC charger corresponds to a higher demand, a battery configured to be charged by an AC charger corresponds to a lower demand), and the demand is determined based on the vehicle status information, which includes the condition. As yet another example, the demand represents a priority of the request for the specific quantity of electric energy (e.g., a vehicle behind schedule, a rush delivery vehicle, or an emergency vehicle may have a higher demand than another vehicle having less remaining charge), and the demand is determined based on the vehicle status information, which includes priority. As yet another example, the demand represents other conditions such as driver behavior, vehicle efficiency, vehicle software configuration, and equipment type (e.g., $3^{rd}$ party), and the demand is determined based on the vehicle status information, which includes one or more of these conditions.

In some embodiments, a first set of demands and a second set of demands are determined (e.g., by the vehicle charging system 100, by the server 220, by the electronic device 230) from the demands of the plurality of electric vehicles. In some embodiments, determining the first set of demands and the second set of demands to optimize charging comprises performing multi-way greedy algorithm, Kamarkar and Karp algorithm, balanced largest-first differencing algorithm, Sequential Number Partitioning (SNP) algorithm, Recursive Number Partitioning (RNP) algorithm, LRM algorithm, meld algorithm, a similar algorithm as would be appreciated by one skilled in the art, or any combination thereof.

In some embodiments, the first and second set of demands are determined based on a deadline for charging the plurality of electric vehicles (e.g., the sets of demands are determined such that the plurality of electric vehicles finish charging by 7:00). The deadline may be provided by an input (e.g., to the vehicle charging system 100, to the server 220, to the electronic device 230) or determined based on vehicle status information from the vehicles.

As an example, 12 electric vehicles to be charged by vehicle charging system 100 have the following demands in kWh. In some embodiments, the demands are determined based on vehicle status information received from the 12 electric vehicles. It is appreciated that the demand may represent a quantity other than a requested amount of energy.
13.04992416, 76.74912841, 126.79026686, 15.3328324, 90.36737389, 121.84920409, 21.48424985, 133.87906456, 60.41001601, 72.7589696, 28.87260615, 37.56484997

The energy demands are sorted in decreasing order:
[133.8790645640093,
126.79026686144546,
121.8492040947743,
90.36737388685643,
76.74912840553496,
72.75896959799212,
60.410016013811635,
37.564849970103495,
28.872606151679214,
21.48424984500692,
15.33283239691239,
13.0499241556962]

In some embodiments, sets of demands, comprising a first set and a second set, are determined from the demands of the electric vehicles. In some embodiments, a number of sets of demands correspond to number of chains of power dispensers where the electric vehicles are to be charged. In this example, three sets of demands are determined, and each set of demands comprises four electric vehicle demands. The sets of demands (e.g., the first set of demands, the second set of demands) are determined such that differences between sums of the sets of demands are within a threshold value (e.g., one-third of an optimal sum (e.g., total demand/number of chains)) (e.g., to advantageously ensure that the demands of each chain are evenly satisfied (e.g., the chains have similar charging times, vehicle-charging priority is satisfied) with in a threshold difference). In some embodiments, each set of demands comprises the highest demands and the lowest demands. For example, for three sets, each of the three sets would comprise one of the three highest demands and one of the three lowest demands, and the other demands may be distributed between the sets such that differences between sums of the sets of demands are within the threshold value.

In this example, the sets of demands may be organized as follows:
{0: [133.8790645640093,
72.75896959799212,
37.564849970103495,
15.33283239691239],
1: [126.79026686144546,
76.74912840553496,
60.410016013811635,
13.0499241556962],
2: [121.8492040947743,
90.36737388685643,
28.872606151679214,
21.48424984500692]}

In this example, the sum of the demand set 0 is 259.6 kWh, the sum of the demand set 1 is 276.9 kWh, and the sum of the demand set 2 is 262.6 kWh. The demand set 0 comprises the highest demand 133.9 kWh, the demand set 1 comprises the second highest demand 126.8 kWh, and the demand set 2 comprises the third highest demand 121.8 kWh. The demand set 0 comprises the second lowest demand 15.3 kWh, the demand set 1 comprises the lowest demand 13 kWh, and the demand set 2 comprises the third lowest demand 21.5 kWh. The other demands may be distributed between the sets such that differences between sums of the sets of demands are within the threshold value (e.g., according to a disclosed charging optimization method). Determining the three sets of demands for the three chains of power dispensers may advantageously ensure that the demands of each chain are evenly satisfied (e.g., the chains have similar charging times, vehicle-charging priority is satisfied) with in a threshold difference.

In some embodiments, based on the sets of demand, the electric vehicles are assigned to power dispensers. In some embodiments, via communication with the power dispensers, initiation of charging sessions with the assigned electric vehicles is facilitated.

Using this example, the vehicle having a demand of 133.9 kWh is assigned to a first power dispenser (e.g., power dispenser 104A) of a first chain (e.g., chain 106A) of power dispensers. An indication or instruction of the assignment may be transmitted to the vehicle. In response to receiving the indication or instruction, the vehicle travels to the first dispenser of the first chain. For example, the assignment information is conveyed to a driver of the vehicle (e.g., via a user interface of the vehicle, via an electronic device of the driver), and the driver maneuvers the vehicle to the power dispenser based on this information. As another example, in response to receiving the indication or instruction, the vehicle is configured to autonomously travel to the assigned power dispenser (e.g., autonomously travel from the vehicle's current location (e.g., an entrance of a charging facility) to the assigned power dispenser). After the first vehicle is assigned to the first power dispenser of the first chain, initiation of a first charging session with the first vehicle is facilitated via communication with the first power dispenser of the first chain. For example, the charging session is initiated when the vehicle electrically couples to the power dispenser. As another example, the server 220 or electronic device 230 facilitates initiation (e.g., sends instruction to the power dispenser to initiate charging) of the charging session with the vehicle. In some embodiments, after the power dispenser finishes charging the vehicle, a next power dispenser in the chain begins charging the vehicle assigned to the next power dispenser.

Using this example, the vehicle having a demand of 126.8 kWh is assigned to a first power dispenser (e.g., power dispenser 104E) of a second chain (e.g., chain 106B) of power dispensers. An indication or instruction of the assignment may be transmitted to the vehicle. In response to receiving the indication or instruction, the vehicle travels to the first dispenser of the second chain. For example, the assignment information is conveyed to a driver of the vehicle (e.g., to a user interface of the vehicle, to an electronic device of the driver), and the driver maneuvers the vehicle to the power dispenser based on this information. As another example, in response to receiving the indication or instruction, the vehicle is configured to autonomously travel to the assigned power dispenser. After the second vehicle is assigned to the first power dispenser of the second chain, initiation of a second charging session with the second vehicle is facilitated via communication with the first power dispenser of the second chain. For example, the charging session is initiated when the vehicle electrically couples to the power dispenser. As another example, the server 220 or electronic device 230 facilitates initiation (e.g., sends instruction to the power dispenser to initiate charging) of the charging session with the vehicle. In some embodiments, after the power dispenser finishes charging the vehicle, a next power dispenser in the chain begins charging the vehicle assigned to the next power dispenser.

Using this example, the vehicle having a demand of 72.8 kWh is assigned to a second power dispenser (e.g., power dispenser 104B) of the first chain (e.g., chain 106A) of power dispensers. After the third vehicle is assigned to the second power dispenser of the first chain, initiation of a third charging session with the third vehicle is facilitated via communication with the second power dispenser of the first chain. For example, the charging session is initiated when the vehicle electrically couples to the power dispenser and the vehicle at the first power dispenser of the chain finishes charging. As another example, the server 220 or electronic device 230 facilitates initiation (e.g., sends instruction to the power dispenser to initiate charging) of the charging session with the vehicle, and the vehicle begins charging when the vehicle at the first power dispenser of the chain finishes charging.

In some embodiments, the indications or instructions for assignments and charging initiations are transmitted at a same time, after the sets of demands are determined. In some embodiments, the indications or instructions for assignments and charging initiations are transmitted at different times, based on a status of a vehicle (e.g., the vehicle is not ready to return to the charging station).

In some embodiments, whether the first vehicle is electrically coupled to the first power dispenser of the first chain is determined. In some embodiments, in accordance with a determination that the first vehicle is electrically coupled to the first power dispenser of the first chain, the first charging session with the first vehicle is initiated. For example, the vehicle charging system 100, server 220, and/or electronic device 230 determines that the charging cable of the first power dispenser of the first chain is connected to the first vehicle. As another example, the vehicle charging system 100, server 220, and/or electronic device 230 determines that the first vehicle is positioned over a wireless charging pad (configured to transmit power wirelessly to the vehicle's battery) of the first power dispenser of the first chain. In accordance with this determination, the vehicle charging system 100, server 220, and/or electronic device 230 causes (via the communication) the first power dispenser of the first chain to begin charging the first vehicle.

In some embodiments, in accordance with a determination that the first vehicle is not electrically coupled to the first power dispenser of the first chain, initiating the first charging session with the first vehicle is forgone. For example, the vehicle charging system 100, server 220, and/or electronic device 230 determines that the charging cable of the first power dispenser of the first chain is not connected to the first vehicle. As another example, the vehicle charging system 100, server 220, and/or electronic device 230 determines that the first vehicle is not positioned over the wireless charging pad of the first power dispenser of the first chain. In accordance with this determination, the vehicle charging system 100, server 220, and/or electronic device 230 causes the first power dispenser of the first chain to forgo charging the first vehicle (until it is determined that the first vehicle is electrically coupled to the first power dispenser of the first chain).

In some embodiments, whether the second vehicle is electrically coupled to the first power dispenser of the second chain is determined. In some embodiments, in accordance with a determination that the second vehicle is electrically coupled to the first power dispenser of the second chain, the second charging session with the second vehicle is initiated. For example, the vehicle charging system 100, server 220, and/or electronic device 230 determines that the charging cable of the first power dispenser of the second chain is connected to the second vehicle. As another example, the vehicle charging system 100, server 220, and/or electronic device 230 determines that the second vehicle is positioned over a wireless charging pad of the first power dispenser of the second chain. In accordance with this determination, the vehicle charging system 100, server 220, and/or electronic device 230 causes (via the communication) the first power dispenser of the second chain to begin charging the first vehicle.

In some embodiments, in accordance with a determination that the second vehicle is not electrically coupled to the first power dispenser of the second chain, initiating the second charging session with the second vehicle is forgone. For example, the vehicle charging system 100, server 220, and/or electronic device 230 determines that the charging cable of the first power dispenser of the second chain is not connected to the second vehicle. As another example, the vehicle charging system 100, server 220, and/or electronic device 230 determines that the second vehicle is not positioned over the wireless charging pad of the first power dispenser of the second chain. In accordance with this determination, the vehicle charging system 100, server 220, and/or electronic device 230 causes the first power dispenser of the second chain to forgo charging the second vehicle (until it is determined that the second vehicle is electrically coupled to the first power dispenser of the second chain).

In some embodiments, because the vehicles with the highest demands are assigned to the first power dispensers of a respective chain, these vehicles with the highest demands are charged first. For example, the vehicle having a demand of 133.9 kWh is charged by a first power dispenser (e.g., power dispenser 104A) of a first chain (e.g., chain 106A). This vehicle is the first vehicle of the first chain to charge. As another example, the vehicle having a demand of 126.8 kWh is charged by a first power dispenser (e.g., power dispenser 104E) of a second chain (e.g., chain 106B). This vehicle is the first vehicle of the second chain to charge. In some instances, by charging the vehicle with the highest demands first, the vehicles with the highest demand are allowed the most time to charge by a charger with the highest charging output capability, allowing the most demanding vehicles of the fleet to return to operation on schedule.

In some embodiments, because the vehicles with the lowest demands are assigned to the last power dispensers of a respective chain, these vehicles with the lowest demands are charged last. For example, the vehicle having a demand of 15.3 kWh is charged by a last power dispenser (e.g., power dispenser 104D) of the first chain (e.g., chain 106A). This vehicle is the last vehicle of the first chain to charge. As another example, the vehicle having a demand of 13 kWh is charged by a last power dispenser (e.g., power dispenser 104H) of the second chain (e.g., chain 106B). This vehicle is the last vehicle of the second chain to charge. In some instances, by charging the vehicle with the lowest demands last, the vehicles with the highest demand are allowed the most time to charge by a charger with the highest charging output capability, allowing vehicles of the fleet with different demands to return to operation on schedule.

In some embodiments, the sets of demands are further determined based on available energy outputs of the power dispensers, and the different energy outputs of the power dispensers are normalized for determining the sets of demands. For example, some of the power dispensers 104A-104L are DC chargers, and some of the power dispensers 104A-104L are AC chargers. The capacity of the DC chargers may be defined as:

Max output of a DC power dispenser×number of DC power dispensers=DCCap

The capacity of the AC chargers may be defined as:

Max output of an AC power dispenser×number of AC power dispensers=ACCap

A desired ratio may be defined as:

Desired Ratio=ACCap/DCCap

For example, the max output of a DC power dispenser is 50 kW, and the max output of an AC power dispenser is 11.5 kW. In some embodiments, the vehicles are divided into groups by demand (e.g., one group for a different power dispenser output capability (e.g., one group for DC charger, one group for AC charger)) such that the ratio of the sums between the groups are within a threshold value of the desired ratio.

As an example, a system comprises six AC power dispensers configured to provide a 11.5 kW maximum output and six DC power dispensers configured to provide a 50 kW maximum output. ACCap for this example would be 69 kW, and DCCap for this example would be 300 kW. The desired ratio would be 19/81 (e.g., ideally, vehicles corresponding to 19% of the total demand would be assigned to AC power dispensers, and vehicles corresponding to the remaining demand (e.g., 81%) would be assigned to DC power dispensers). In this example, vehicles corresponding to the lowest six demands (e.g., 60.410016013811635, 37.564849970103495, 28.872606151679214, 21.48424984500692, 15.33283239691239, 13.0499241556962) would be assigned to AC power dispensers, and the highest six demands (e.g., vehicles corresponding to the remaining demands) would be assigned to DC power dispensers. The vehicles assigned to AC power dispensers may be more specifically assigned by performing the operations associated with the first example, and the vehicles assigned to DC power dispensers may be more specifically assigned (separate from the vehicles assigned to the AC power dispensers) by performing the operations associated with the first example.

After the groups are determined, the vehicles of each group are assigned to the chargers of each group (e.g., as described with respect to the example with 12 chargers of a same type).

Although this example is described with respect to DC and AC chargers, it is appreciated that the disclosed vehicle charging system may include DC and/or AC chargers with different outputs, and the disclosed methods would allow the electric vehicles to be optimally charged by the vehicle charging system.

Although the examples are described with respect to chains of chargers, it is appreciated that the disclosed vehicle charging system may include chargers that are not organized in chains, and by performing the disclosed methods (e.g., taking account of the sequential nature of the chains may be forgone, demands may not be organized in sets, demands are organized into one set such that an index of the organized set corresponds to a charger), the electric vehicles would be optimally charged by the vehicle charging system described herein. For example, the vehicle charging system comprises a plurality of chargers that are configured for different power outputs (e.g., between 6 kW to 350 kW), and the operations described herein advantageously allow an appropriate charger to charge an electric vehicle (e.g., a charger configured for a lower power output charges an electric vehicle having a lower demand) based on the vehicle's demand.

In some embodiments, updated vehicle status information of the electric vehicles (e.g., based on an update of a schedule of a vehicle, a vehicle experienced an unforeseen event) are received. In some embodiments, an updated vehicle status information is received from an electric vehicle (e.g., by the vehicle charging system 100, by the server 220, by the electronic device 230). In some embodiments, in response to receiving the updated vehicle status information, updated set of demands are determined (e.g., by the vehicle charging system 100, by the server 220, by the electronic device 230) based on the updated vehicle status information. As an example, the sets of demands or some sets of demands (e.g., some vehicles may be charging when the updated demand is received, so some vehicles may not be reassigned) are re-determined based on the updated vehicle status information, using the methods described herein. As yet another example, a set of demands corresponding to the updated vehicle status information may be updated (e.g., the set is reordered based on the updated demand). Power dispenser assignments determined based on the updated set of demands may be transmitted (e.g., to other vehicles affected by the reassignments), and initiations of charging sessions with the vehicles at their reassigned power dispensers are facilitated, as described herein.

In some embodiments, prior to receiving the updated vehicle status information from the vehicle, the vehicle was assigned to charge at a third power dispenser. In accordance with the determination of the updated set of demands (e.g., by the vehicle charging system 100, by the server 220, by the electronic device 230, as described above), the vehicle is assigned to a fourth power dispenser, different from the third power dispenser. For example, an indication or instruction to assign the vehicle to charge at the power dispenser 104B was transmitted. Based on an updated vehicle status information from the vehicle, the sets of demands are updated (e.g., as described above), and based on the updated demand, the vehicle is assigned to a different power dispenser (e.g., the vehicle may be assigned closer to the front of the chain if the corresponding updated demand is higher, the vehicle may be assigned farther from the front of the chain if the corresponding updated demand is lower) is transmitted. Power dispenser assignments determined based on the updated set of demands may be transmitted (e.g., to other vehicles affected by the reassignment).

In some embodiments, a vehicle is added to the plurality of electric vehicles to be charged (e.g., after the sets of demands are determined). In some embodiments, vehicle status information from the added vehicle (e.g., a vehicle that does not belong to the plurality of electric vehicles associated with the previously determined set of demands) is received. In response to receiving the vehicle status information from the added vehicle, updated sets of demands based on the vehicle status information from the added vehicle is determined (e.g., by the vehicle charging system 100, by the server 220, by the electronic device 230, as described above). Power dispenser assignments determined based on the updated set of demands may be transmitted. In some embodiments, in accordance with a determination that the vehicle cannot be charged by the power dispensers (e.g., all power dispensers have been assigned), determination of the updated sets of demand is forgone. An indication or instruction to charge at different power dispensers or to charge at the power dispensers at a different time may be transmitted.

In some embodiments, a vehicle is removed from the plurality of electric vehicles to be charged (e.g., after the sets of demands are determined). In some embodiments, an indication or instruction to remove a demand of a vehicle (e.g., a vehicle that had a previous assignment) is received. In response to receiving the indication or the instruction to remove the demand of the vehicle, updated sets of demands based on the removed vehicle is determined (e.g., by the vehicle charging system 100, by the server 220, by the electronic device 230, as described above). Power dispenser assignments determined based on the updated set of demands may be transmitted.

Although an example with 12 electric vehicles with corresponding requested amount of energy is described, it is appreciated that the disclosed vehicle charging methods may be performed for different numbers of electric vehicles. Although an example with 12 power dispensers organized along three chains is described, it is appreciated that the disclosed vehicle charging systems may comprise different number of power dispensers organized in different number of chains or power dispensers not organized in chains.

Figure 2:
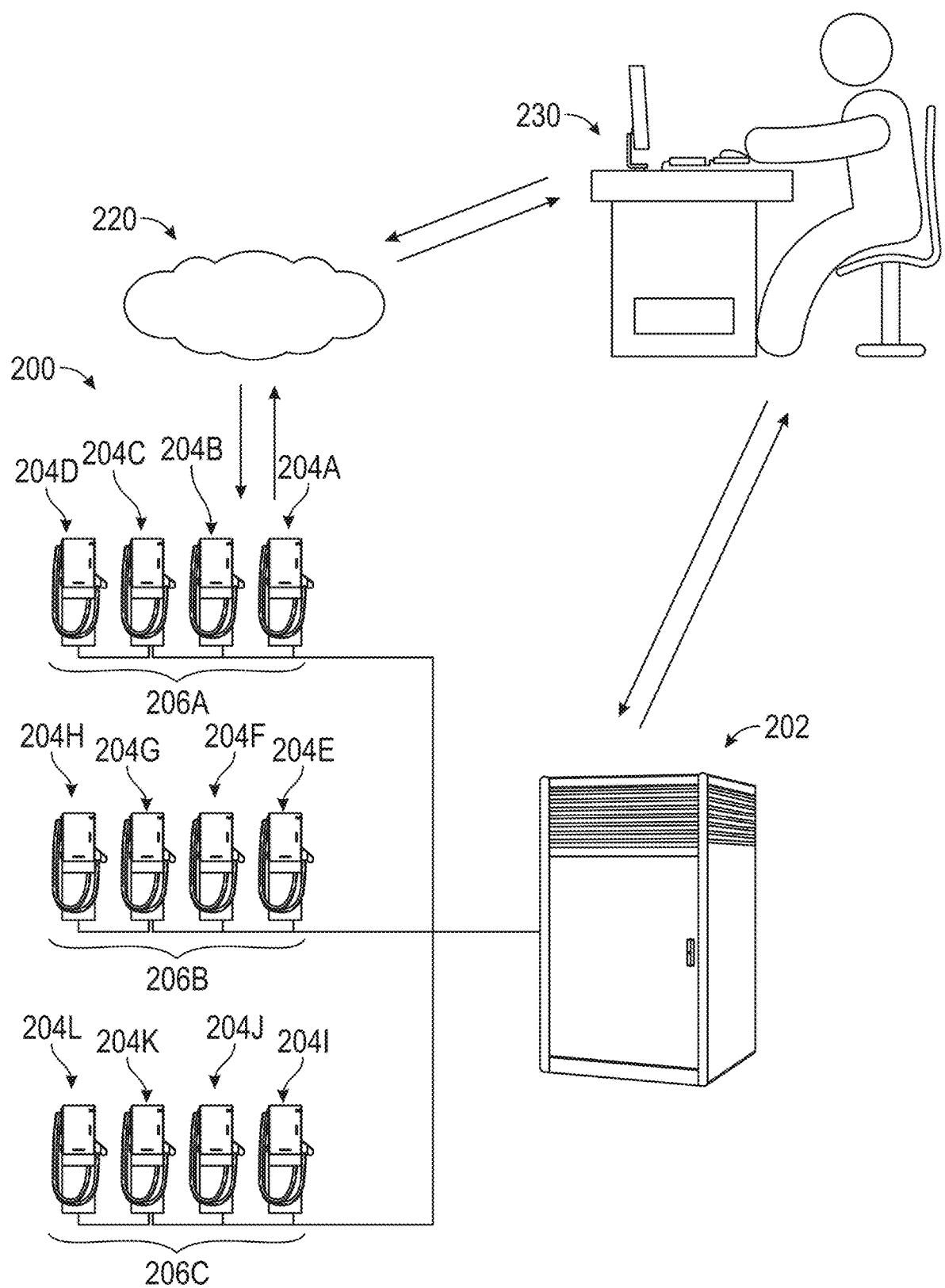
FIG. 2 illustrates an overview of an example system for charging an electric vehicle fleet.

FIG. 2 illustrates an overview of an example vehicle charging system 200 for charging an electric vehicle fleet. In some embodiments, the vehicle charging system 200 corresponds to the vehicle charging system 100 (e.g., power cabinet 202 corresponds to power cabinet 102, power dispensers 204A-204L correspond to power dispensers 104A-104L), and the vehicle charging system 200 is configured to communicate with another electronic device and/or system. For example, as illustrated the system 200 is configured to communicate with server 220 and/or electronic device 230.

In some embodiments, the server 220 is a cloud server. The server 220 may be configured to perform the operations described herein. For example, the server 220 communicates with the vehicle charging system 200 for operating the charging system 200. The server 220 may provide data, such as vehicle assignment information, software updates, machine learning outputs (e.g., output of machine learning algorithm for determining vehicle assignment) to the charging system 200, and receive data, such as charger status, vehicle charging status, maintenance warnings, from the charging system 200. In some embodiments, the server 220 is configured to receive information (e.g., vehicle status information) from electric vehicles, and based on the received information, the server 220 determines vehicle assignment (as disclosed herein) and facilitates initiation of charging sessions via communications with respective power dispensers assigned to the vehicles. In some embodiments, if connection between system 200 and server 220 is lost, a processor of system 200 or an edge computer (not shown) is configured to perform the disclosed operations in place of server 220 (e.g., until connection between system 200 and server 200 is restored).

In some embodiments, the electronic device 230 is a device of a user operating the vehicle charging system 200. The electronic device 230 may communicate with the vehicle charging system 200 via server 220 and/or directly. In some embodiments, the electronic device 230 comprises an operating system or software (e.g., a software application provided by the server and executing on the electronic device 230) for managing electric vehicles to be charged by the vehicle charging system 200. For example, the user manages a fleet of electric vehicles, and the electronic device 230 is configured to operate the vehicle charging system 200 and provide information about the vehicle charging system 200, in response to receiving the user's input (e.g., route for the electric vehicles for the future, current route update for the electric vehicles). For example, the electronic device 230 is configured to receive display information indicating assignment of vehicles to their respective power dispensers (e.g., from the server 220, from the vehicle charging system 200), and the electronic device 230 is configured to present the display information. As another example, the electronic device 230 is configured to receive display information about the vehicles' charging status after they are assigned to their respective power dispensers (e.g., from the server 220, from the vehicle charging system 200). As yet another example, the electronic device 230 is configured to receive display information indicating battery condition (e.g., current state of charge, estimated state of charge upon arriving at system 200, battery performance, battery age, other examples of battery condition described herein) of the electric vehicles to be charged by system 200, and the electronic device 230 is configured to present the display information.

In some embodiments, the electronic device 230 is configured to perform the operations described herein. For example, the electronic device 230 communicates (directly or via server 220) with the vehicle charging system 200 for operating the charging system 200. The electronic device 230 may provide data, such as vehicle assignment information, software updates to the charging system 200, and receive data, such as charger status, vehicle charging status, maintenance warnings, from the charging system 200. In some embodiments, the electronic device 230 is configured to receive information (e.g., vehicle status information) from electric vehicles, and based on the received information, the electronic device 230 determines vehicle assignment (as disclosed herein using e.g., the operating system or software running on the electronic device 230) and facilitates initiation of charging sessions via communications with respective power dispensers assigned to the vehicles.

FIG. 3A-3D illustrate example operations of a system 300 for charging an electric vehicle fleet. In some embodiments, the vehicle charging system 300 comprises power cabinet 302 and power dispensers 304A-304L organized along chains 306A-306C. In some embodiments, the vehicle charging system 300 corresponds to vehicle charging system 100 and/or 200. It is appreciated that, in some embodiments, the vehicle charging system 300 shares features and advantages similar to the vehicle charging system 100 and/or 200.

In some embodiments, electric vehicles 308A-308L are assigned (e.g., using the methods described herein) to power dispensers 306A-306L, respectively. In some embodiments, at least one of the electric vehicles 308A-308L is an electric delivery vehicle. For example, vehicles charging at the chain 306A correspond to the demand set 0 of the above example (e.g., electric vehicle 308A has a demand of 113.9 kWh, electric vehicle 308B has a demand of 72.8 kWh, electric vehicle 308C has a demand of 37.6 kWh, electric vehicle 308D has a demand of 15.3 kWh).

In some embodiments, initiation of the charging sessions with the vehicles is facilitated via communications with the respective power dispensers. For example, a charging session is initiated when a vehicle electrically couples to a power dispenser and it is the vehicle's turn to charge. As another example, the server 220 or electronic device 230 facilitates initiation (e.g., sends instruction to the power dispenser to initiate charging when it is the vehicle's turn to charge) of the charging session with the vehicle.

In some embodiments, the power dispensers are daisy-chained, meaning energy is provided to a chain of power dispenser in a sequential manner. For example, energy may be provided to a first power dispenser of a chain (e.g., a power dispenser closest in proximity (e.g., in terms of electrical connection) from the power cabinet (e.g., power dispenser 304A of chain 306A)). After the first power dispenser ceases receiving energy (e.g., a vehicle finishes charging using the first power dispenser) from the power cabinet, energy is provided to a second power dispenser of the chain (e.g., a power dispenser second closest in proximity (e.g., in terms of electrical connection) to the power cabinet (e.g., power dispenser 304B of chain 306A), and so on).

Figure 3A:
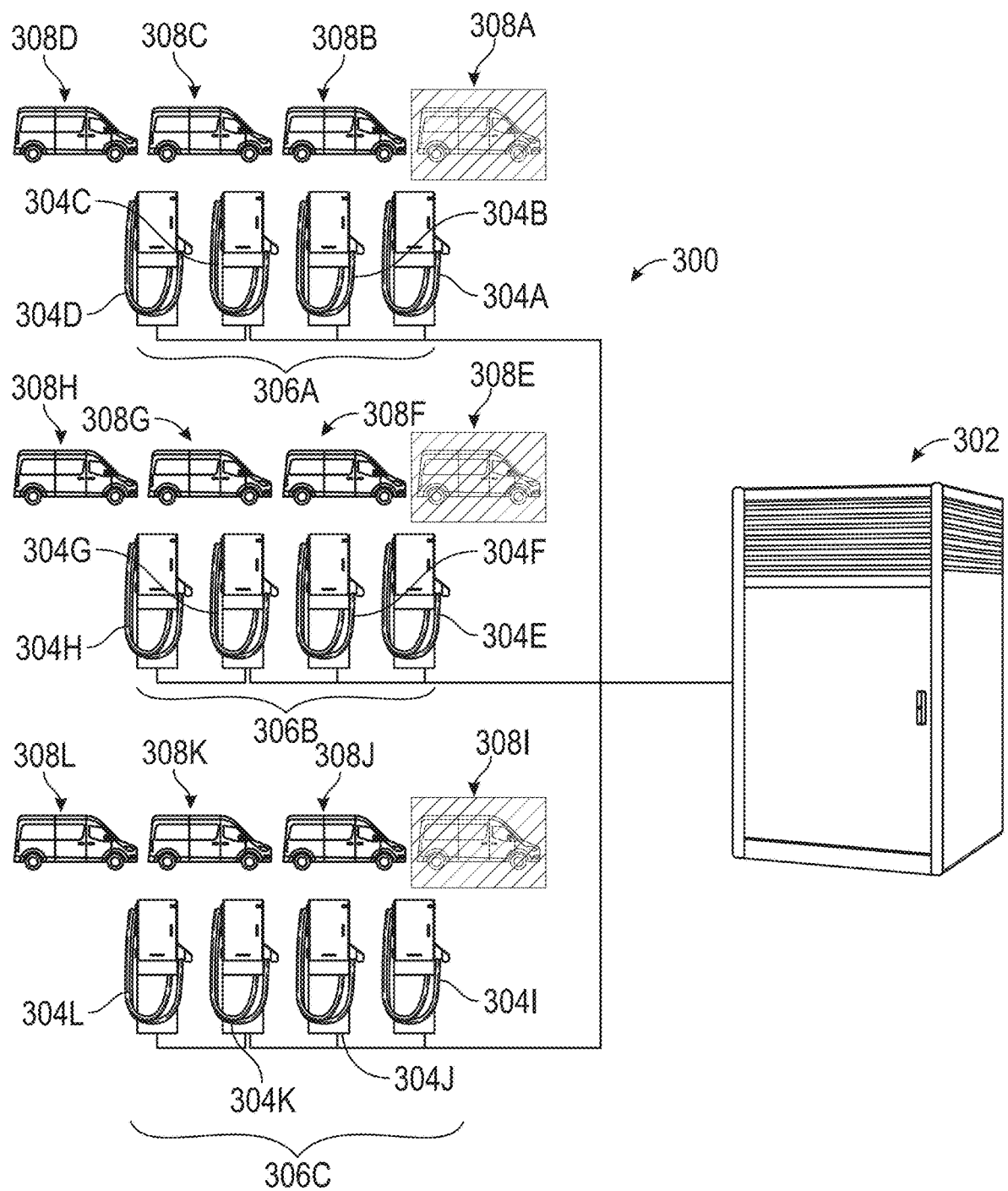
FIG. 3A-3D illustrate example operations of a system for charging an electric vehicle fleet.

As illustrated in FIG. 3A, energy is provided to the first power dispensers (e.g., power dispensers 304A, 304E, and 304I) to charge electric vehicles 308A, 308E, and 308I. In some embodiments, a first power dispenser of a chain is configured for a highest charging output of the chain. For example, the power dispenser 304A is configured for a higher output than each of the power dispensers 304B-304D. By charging the electric vehicles with the highest demands with the power dispensers with the highest charging output capabilities, allowing such vehicles the most time to charge by a charger with the highest charging output capability, allowing the most demanding vehicles of the fleet to return to operation on schedule. Although the vehicles of a same position of a respective chain are shown to be charging at a same time by FIGS. 3A-3D, it is appreciated that the vehicles at different positions of the respective chain may be charging at a same time. For example, after the electric vehicle 308E finishes charging by the power dispenser 304E, the power dispenser 304F may be charging the electric vehicle 308F, while the electric vehicle 304A is charged by power dispenser 304A.

Figure 3B:
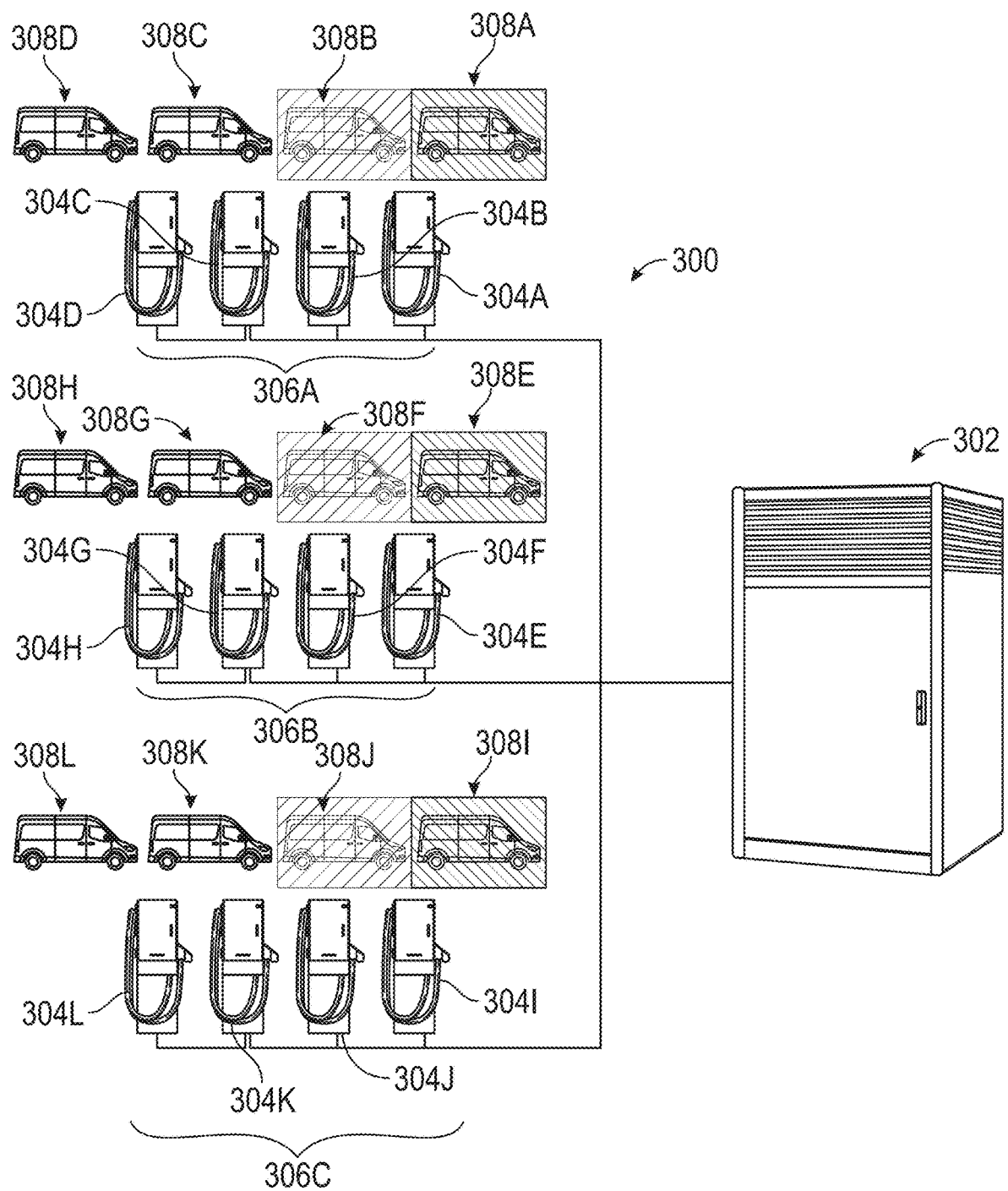

After the vehicles at the first power dispensers finish charging, the first power dispenser ceases receiving energy from the power cabinet, energy is provided to a second power dispenser of the chain (e.g., a power dispenser second closest in proximity (e.g., in terms of electrical connection) to the power cabinet (e.g., power dispenser 304B of chain 306A). As illustrated in FIG. 3B, the power dispenser 304B charges electric vehicle 308B, the power dispenser 304F charges electric vehicle 308F, and the power dispenser 304J charges electric vehicle 308J. It is appreciated that the vehicles at different positions of the respective chain may be charging at a same time. For example, after the electric vehicle 308J finishes charging by the power dispenser 304J, the power dispenser 304K may be charging the electric vehicle 308K, while the electric vehicle 304F is charged by power dispenser 304F.

Figure 3C:
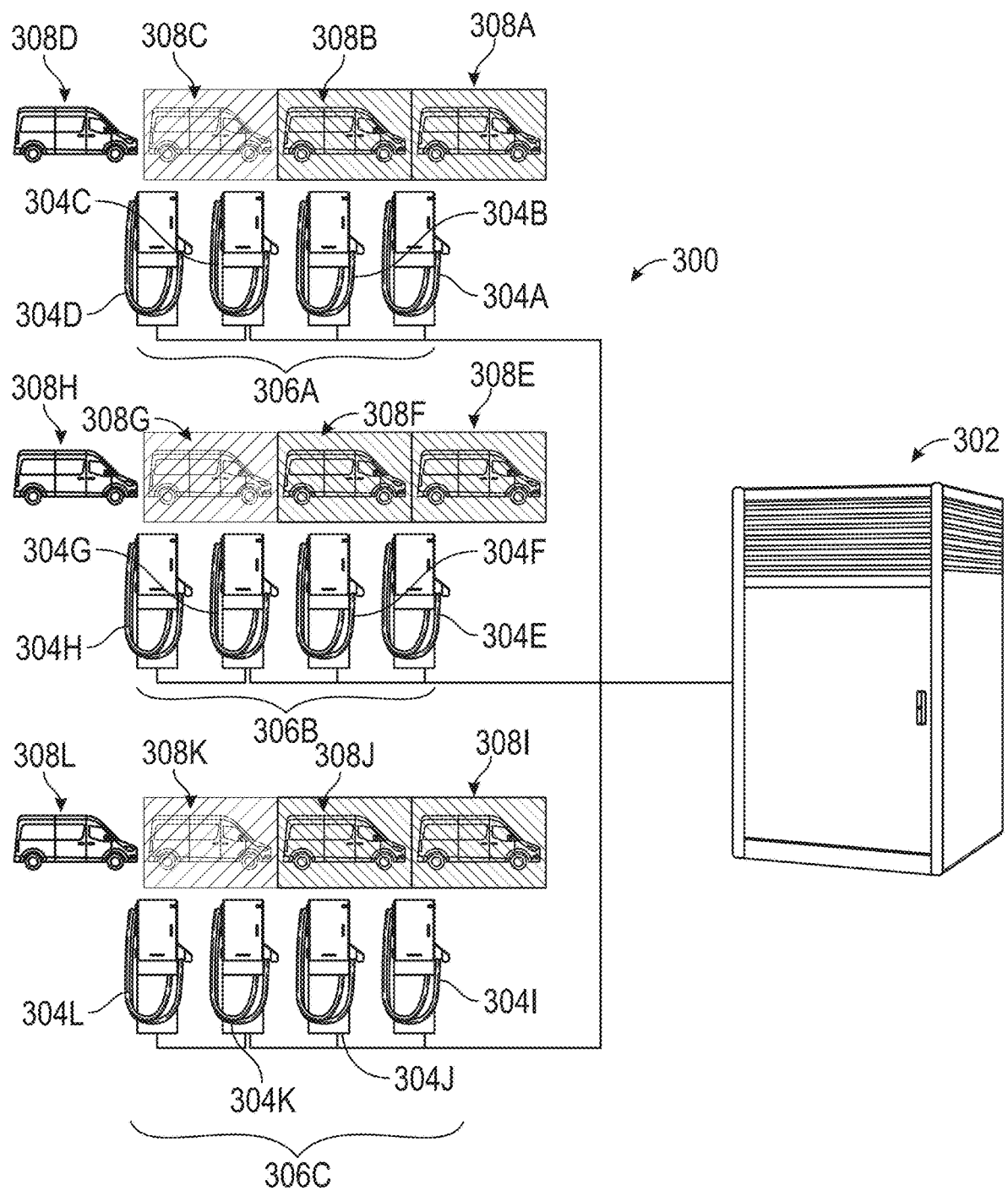

After the vehicles at the second power dispensers finish charging, the second power dispenser ceases receiving energy from the power cabinet, energy is provided to a third power dispenser of the chain (e.g., a power dispenser third closest in proximity (e.g., in terms of electrical connection) to the power cabinet (e.g., power dispenser 304C of chain 306A). As illustrated in FIG. 3C, the power dispenser 304C charges electric vehicle 308C, the power dispenser 304G charges electric vehicle 308G, and the power dispenser 304K charges electric vehicle 308K. It is appreciated that the vehicles at different positions of the respective chain may be charging at a same time. For example, after the electric vehicle 308C finishes charging by the power dispenser 304C, the power dispenser 304D may be charging the electric vehicle 308D, while the electric vehicle 304G is charged by power dispenser 304G.

Figure 3D:
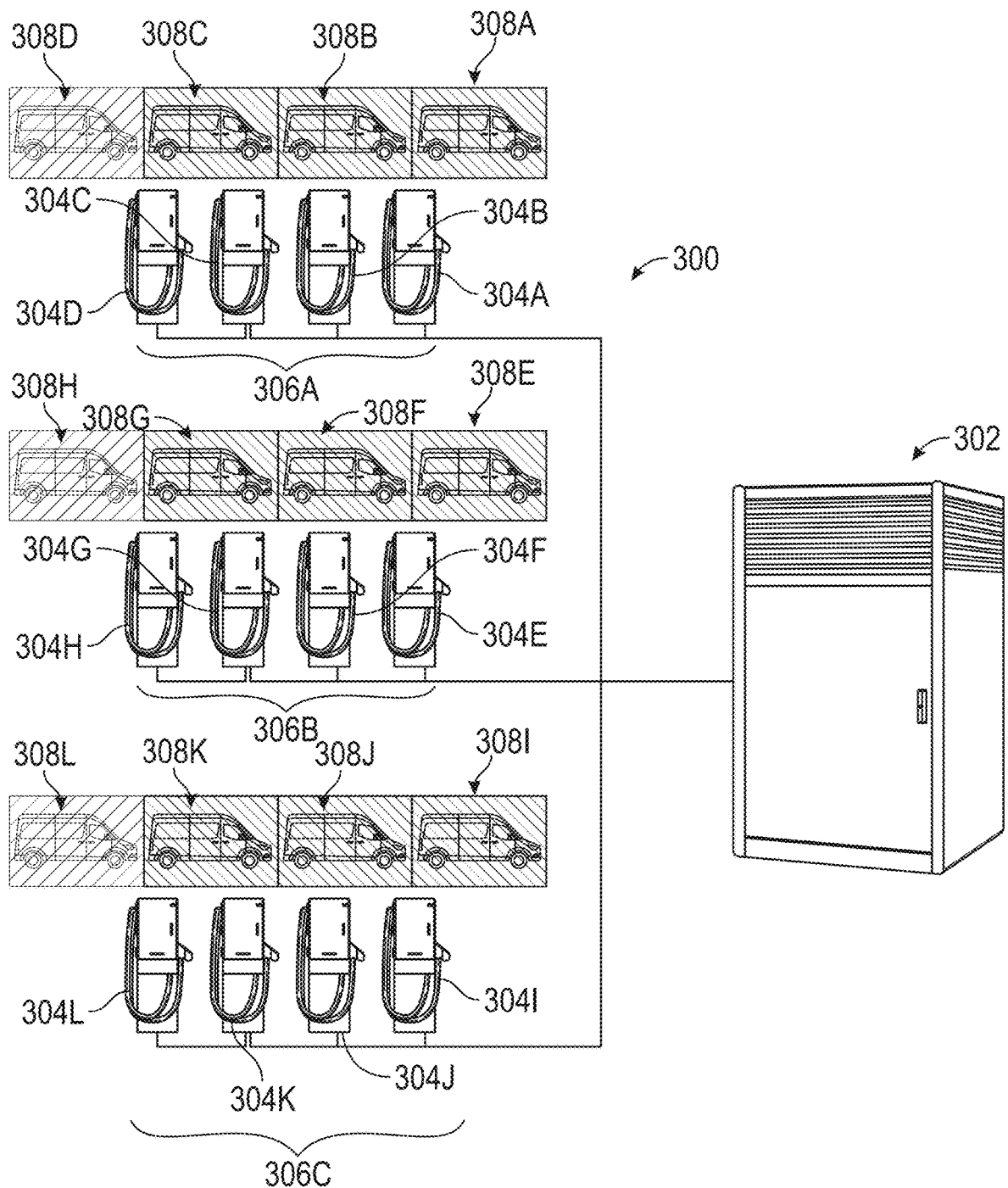

After the vehicles at the third power dispensers finish charging, the third power dispenser ceases receiving energy from the power cabinet, energy is provided to a fourth power dispenser of the chain (e.g., a power dispenser fourth closest in proximity (e.g., in terms of electrical connection, the farthest power dispenser of each chain in this example) to the power cabinet (e.g., power dispenser 304D of chain 306A). As illustrated in FIG. 3D, the power dispenser 304D charges electric vehicle 308D, the power dispenser 304H charges electric vehicle 308H, and the power dispenser 304L charges electric vehicle 308L. It is appreciated that the vehicles at different positions of the respective chain may be charging at a same time. For example, the power dispenser 304D may be charging the electric vehicle 308D, while the electric vehicle 304G is charged by power dispenser 304G.

In some embodiments, based on the vehicles' demands, the vehicle charging system 300, the server 220, and/or electronic device 230 determine how the vehicle charging system is charging the vehicles, allowing the electric vehicles to return to operation on schedule and minimize energy costs. Furthermore, in some embodiments, the disclosed operations of the vehicle charging system allow the chains to have similar charging times and/or vehicle-charging priority to be satisfied, while accounting for different charger power output capabilities.

Although an example with 12 electric vehicles and 12 power dispensers organized along three chains is described, it is appreciated that different number of vehicles may be charged, and the disclosed vehicle charging systems may comprise different number of power dispensers organized in different number of chains or power dispensers not organized in chains.

Figure 4A:
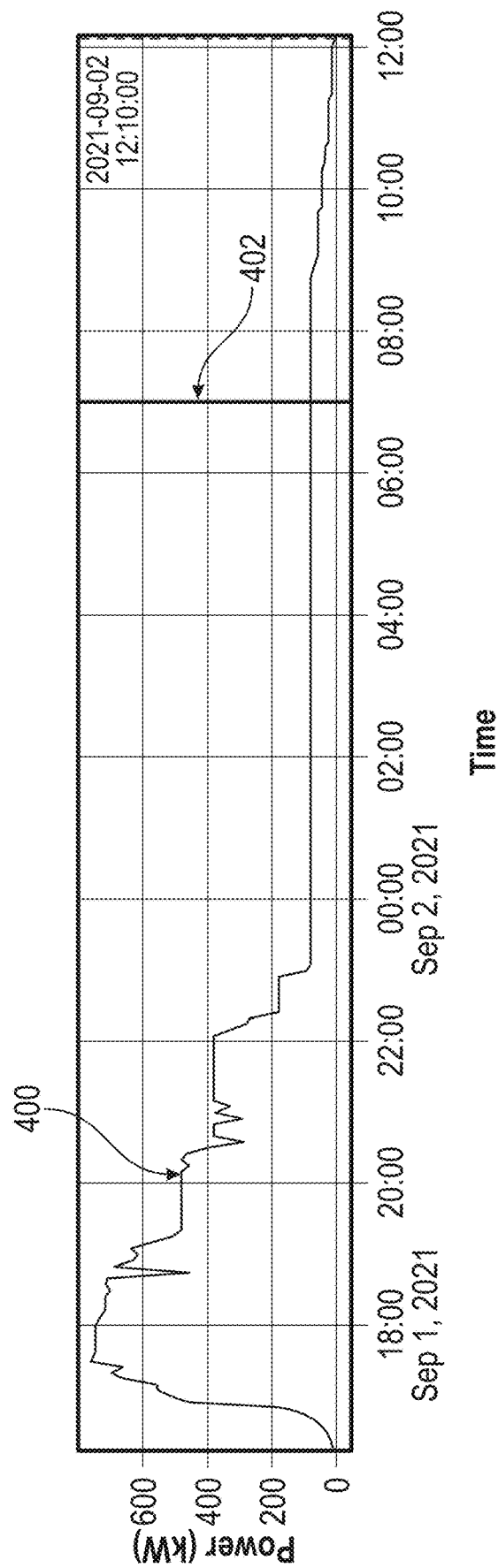
FIG. 4A-4B illustrate example power outputs of systems for charging an electric vehicle fleet.
Figure 4B:
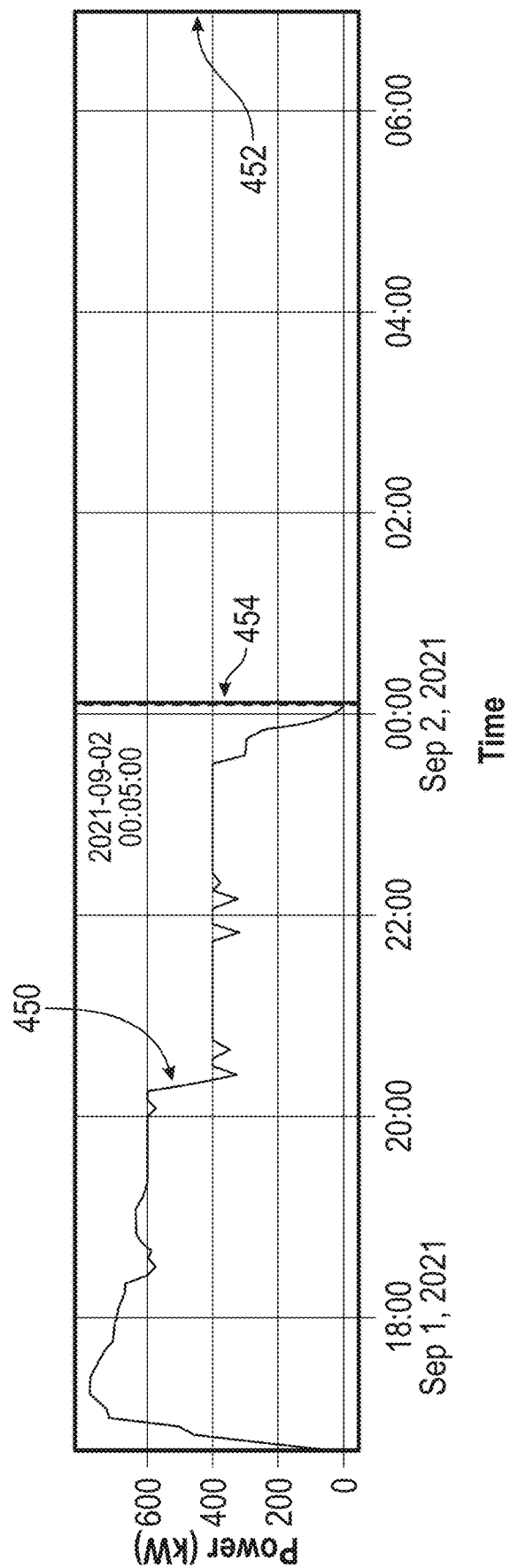

FIG. 4A-4B illustrate example power outputs of systems for charging an electric vehicle fleet. FIG. 4A illustrates a power output 400 of a vehicle charging system. FIG. 4A shows a scenario when e.g., vehicles having the highest demands are charging along a same chain, requiring the chain to output over 450 kWh of energy. As shown in FIG. 4A, most of the vehicles finish charging by 22:00. However, because vehicles having the highest demands are charging along a same chain, this chain of vehicles continue to charge until 12:00 the next day, passing the deadline 402 of 7:00. Without the disclosed methods, some vehicles of the chain may not be ready to return to operation by the deadline of 402, affecting the operation of the entire fleet.

FIG. 4B illustrates a power output 450 of a vehicle charging system. FIG. 4B shows a scenario when the disclosed methods are performed. As shown in FIG. 4B, the vehicles finished at 0:00, well before the deadline 452 of 7:00. In some embodiments, the vehicles corresponding to FIG. 4B are assigned and charged based on the deadline (e.g., in response to receiving a deadline of 7:00, the power dispenser assignment would allow the vehicles to finish charging before 7:00).

Figure 5:
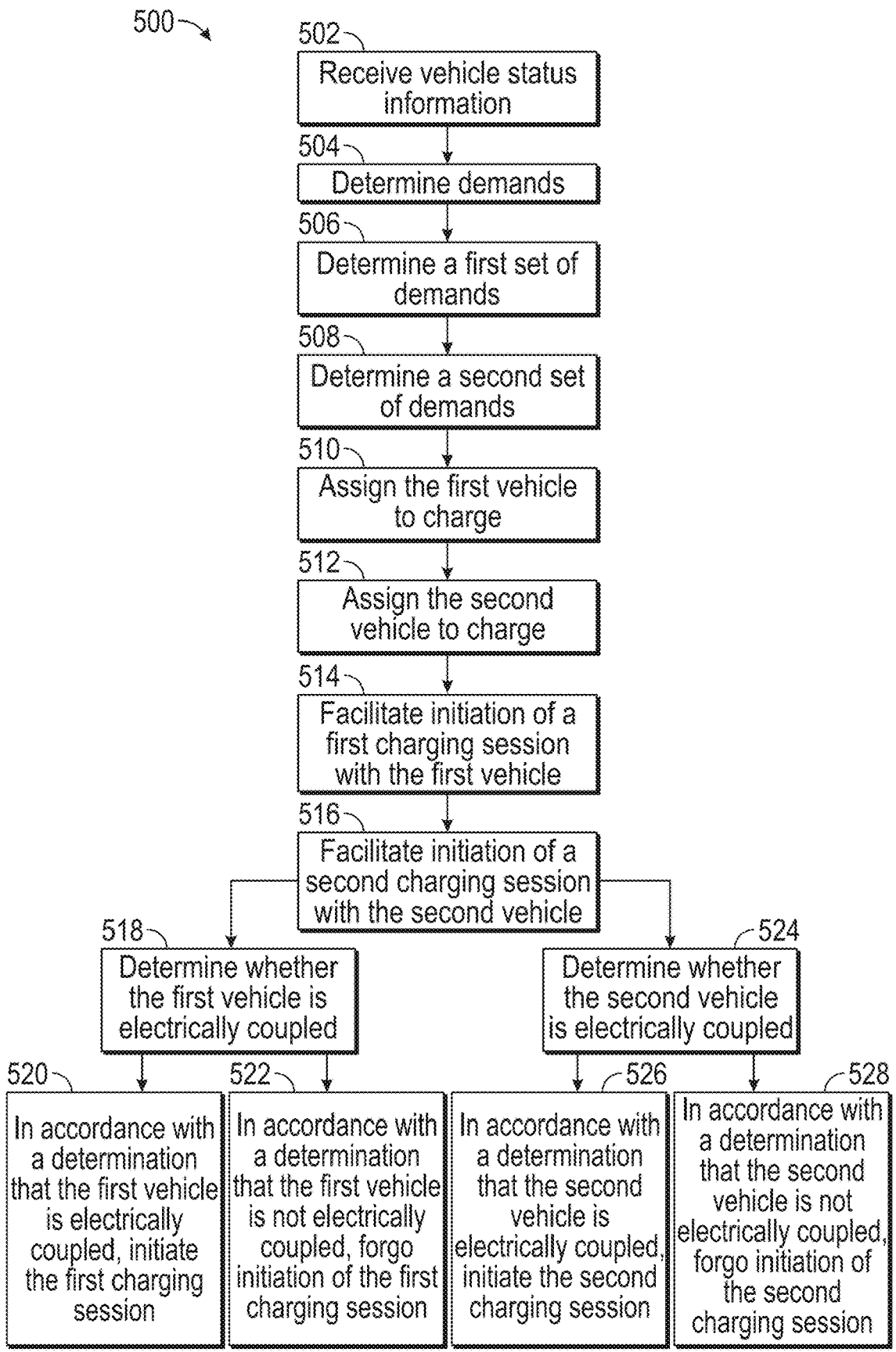
FIG. 5 illustrates an example method for charging an electric vehicle fleet.

FIG. 5 illustrates an example method 500 for charging an electric vehicle fleet. The steps of method 500 may be performed by the vehicle charging systems 100/200/300, server 220, and/or electronic device 230 described with respect to FIGS. 1-3D and 4B. It is appreciated that the steps of method 500 leverage the features and advantages described with respect to FIGS. 1-3D and 4B.

In some embodiments, the method 500 comprises receiving vehicle status information from a plurality of electric vehicles (step 502). In some embodiments, the vehicle status information includes a current state of charge for each of the plurality of electric vehicles. In some embodiments, the method 500 comprises determining, from the vehicle status information, demands of the plurality of electric vehicles (step 504). In some embodiments, each demand represents a specified quantity of electric energy to charge one or more batteries of a corresponding one of the electric vehicles. For example, as described with respect to FIGS. 1-3D, a respective vehicle, the vehicle charging system, the server, and/or the electronic device receive vehicle status information from the plurality of electric vehicles, and the vehicle associated with the vehicle status information, the vehicle charging system, the server, and/or the electronic device determine demands of the electric vehicles based on the vehicle status information. For example, the determination of demands of the electric vehicles based on the vehicle status information may be performed by the server 220, by the vehicle associated with the vehicle status information, or via an application (installed on electronic device 230) provided by the server 220 to another party.

In some embodiments, each demand further represents a priority of the request for the specified quantity of electric energy (e.g., a vehicle behind schedule, a rush delivery vehicle, or an emergency vehicle may have a higher demand than another vehicle having less remaining charge). In some embodiments, each demand further represents a condition of the one or more batteries of the corresponding one of the electric vehicles (e.g., lower battery health or state of charge corresponds to a higher demand).

In some embodiments, the method 500 comprises determining, from the demands of the plurality of electric vehicles, a first set of demands (step 506), and determining, from the demands of the plurality of electric vehicles, a second set of demands (step 508). In some embodiments, a difference between a sum of the first set and a sum of the second set is within a threshold value. In some embodiments, the first set comprises a demand of a first vehicle having the highest demand of the first set, and the second set comprises a demand of a second vehicle having the highest demand of the second set. In some embodiments, determining the first set of demands and the second set of demands further comprises performing multi-way greedy algorithm, Kamarkar and Karp algorithm, balanced largest-first differencing algorithm, SNP and RNP algorithm, LRM algorithm, meld algorithm, a similar algorithm as would be appreciated by one skilled in the art, or any combination thereof.

For example, sets of demands (e.g., demand set 0, demand set 1, demand set 2) are determined from the demands of the electric vehicles by performing the operations described with respect to FIGS. 1-3D. The sum of the demand set 0 is 259.6 kWh, the sum of the demand set 1 is 276.9 kWh, and the sum of the demand set 2 is 262.6 kWh, and the differences between the sums of the demand sets are within a threshold value (e.g., one-third of an optimal sum (e.g., total demand/number of chains)). The demand set 0 comprises a vehicle having a demand of 133.9 kWh, which is the highest demand of the demand set 0. The demand set 1 comprises a vehicle having a demand of 126.8 kWh, which is the highest demand of the demand set 1. The demand set 2 comprises a vehicle having a demand of 121.8 kWh, which is the highest demand of the demand set 2.

In some embodiments, the first set comprises a demand of a third vehicle, the second set comprises a demand of a fourth vehicle, and the demand of the third vehicle and the demand of the fourth vehicle are the lowest and second lowest demand of the demands of the plurality of electric vehicles. For example, as described with respect to FIGS. 1-3D, the demand set 0 comprises the second lowest demand 15.3 kWh, the demand set 1 comprises the lowest demand 13 kWh, and the demand set 2 comprises the third lowest demand 21.5 kWh.

In some embodiments, the first set of demands and the second set of demands are determined further based on available energy outputs of the first chain and the second chain of power dispensers. In some embodiments, the first chain, the second chain, or the first and second chains comprise a direct current (DC) electric vehicle charger. In some embodiments, the first chain, the second chain, or the first and second chain comprise an alternate current (AC) electric vehicle charger. For example, as described with respect to FIGS. 1-3D, sets of demands are determined while accounting for different output capabilities (e.g., output capability of the DC charger, output capability of the AC charger) of the power dispensers.

In some embodiments, the first set and the second set of demands are determined further based on a deadline for charging the plurality of electric vehicles. For example, as described with respect to FIGS. 1-3D and 4B, the sets of demands are determined such that the plurality of electric vehicles finish charging by 7:00.

In some embodiments, the method 500 comprises assigning the first vehicle to charge at a first power dispenser of a first chain of power dispensers (step 510). In some embodiments, the first power dispenser of the first chain is configured for a highest charging output of the first chain. For example, as described with respect to FIGS. 1-3D, electric vehicle 308A is assigned to charge at the power dispenser 304A of chain 306A. An indication or instruction of the assignment may be transmitted to the vehicle. In response to receiving the indication or instruction, the vehicle travels to the first dispenser of the first chain. For example, the assignment information is conveyed to a driver of the vehicle (e.g., via a user interface of the vehicle, via an electronic device of the driver), and the driver maneuvers the vehicle to the power dispenser based on this information. As another example, in response to receiving the indication or instruction, the vehicle is configured to autonomously travel to the assigned power dispenser (e.g., autonomously travel from the vehicle's current location (e.g., an entrance of a charging facility) to the assigned power dispenser).

In some embodiments, the method 500 comprises assigning the second vehicle to charge at a first power dispenser of a second chain of power dispensers (step 512). In some embodiments, the first power dispenser of the second chain is configured for a highest charging output of the second chain. For example, as described with respect to FIGS. 1-3D, electric vehicle 308E is assigned to charge at the power dispenser 304E of chain 306B. An indication or instruction of the assignment may be transmitted to the vehicle. In response to receiving the indication or instruction, the vehicle travels to the first dispenser of the second chain. For example, the assignment information is conveyed to a driver of the vehicle (e.g., via a user interface of the vehicle, via an electronic device of the driver), and the driver maneuvers the vehicle to the power dispenser based on this information. As another example, in response to receiving the indication or instruction, the vehicle is configured to autonomously travel to the assigned power dispenser (e.g., autonomously travel from the vehicle's current location (e.g., an entrance of a charging facility) to the assigned power dispenser).

In some embodiments, the method 500 comprises facilitating, via communication with the first power dispenser of the first chain, initiation of a first charging session with the first vehicle (step 514), and facilitating, via communication with the first power dispenser of the second chain, initiation of a second charging session with the second vehicle (step 516). For example, as described with respect to FIGS. 1-3D, the vehicle charging system 100/200/300, server 220, and/or electronic device 230 facilitate initiation of a charging session with electric vehicle 308A via communication with power dispenser 304A, and facilitates initiation of a charging session with electric vehicle 308E via communication with electric power dispenser 304E.

In some embodiments, the method 500 comprises determining whether the first vehicle is electrically coupled to the first power dispenser of the first chain (step 518). In some embodiments, in accordance with a determination that the first vehicle is electrically coupled to the first power dispenser of the first chain, the method 500 comprises initiating the first charging session with the first vehicle (step 520). For example, the vehicle charging system 100/200/300, server 220, and/or electronic device 230 determines that the charging cable of the first power dispenser of the first chain is connected to the first vehicle. As another example, the vehicle charging system 100/200/300, server 220, and/or electronic device 230 determines that the first vehicle is positioned over a wireless charging pad (configured to transmit power wirelessly to the vehicle's battery) of the first power dispenser of the first chain. In accordance with this determination, the vehicle charging system 100/200/300, server 220, and/or electronic device 230 causes the first power dispenser of the first chain to begin charging the first vehicle.

In some embodiments, in accordance with a determination that the first vehicle is not electrically coupled to the first power dispenser of the first chain, the method 500 comprises forgoing initiating the first charging session with the first vehicle (step 522). For example, the vehicle charging system 100/200/300, server 220, and/or electronic device 230 determines that the charging cable of the first power dispenser of the first chain is not connected to the first vehicle. As another example, the vehicle charging system 100/200/300, server 220, and/or electronic device 230 determines that the first vehicle is not positioned over the wireless charging pad of the first power dispenser of the first chain. In accordance with this determination, the vehicle charging system 100/200/300, server 220, and/or electronic device 230 causes the first power dispenser of the first chain to forgo charging the first vehicle (until it is determined that the first vehicle is electrically coupled to the first power dispenser of the first chain).

In some embodiments, the method 500 comprises determining whether the second vehicle is electrically coupled to the first power dispenser of the second chain (step 524). In some embodiments, in accordance with a determination that the second vehicle is electrically coupled to the first power dispenser of the second chain, the method 500 comprises initiating the second charging session with the second vehicle (step 526). For example, the vehicle charging system 100/200/300, server 220, and/or electronic device 230 determines that the charging cable of the first power dispenser of the second chain is connected to the second vehicle. As another example, the vehicle charging system 100/200/300, server 220, and/or electronic device 230 determines that the second vehicle is positioned over a wireless charging pad of the first power dispenser of the second chain. In accordance with this determination, the vehicle charging system 100/200/300, server 220, and/or electronic device 230 causes the first power dispenser of the second chain to begin charging the first vehicle.

In some embodiments, in accordance with a determination that the second vehicle is not electrically coupled to the first power dispenser of the second chain, the method 500 comprises forgoing initiating the second charging session with the second vehicle (step 528). For example, the vehicle charging system 100/200/300, server 220, and/or electronic device 230 determines that the charging cable of the first power dispenser of the second chain is not connected to the second vehicle. As another example, the vehicle charging system 100/200/300, server 220, and/or electronic device 230 determines that the second vehicle is not positioned over the wireless charging pad of the first power dispenser of the second chain. In accordance with this determination, the vehicle charging system 100/200/300, server 220, and/or electronic device 230 causes the first power dispenser of the second chain to forgo charging the second vehicle (until it is determined that the second vehicle is electrically coupled to the first power dispenser of the second chain).

In some embodiments, the method 500 comprises assigning a third vehicle to charge at a second power dispenser of the first chain of power dispensers. In some embodiments, the first set comprises a demand of the third vehicle, and the demand of the third vehicle is less than the demand of the first vehicle. For example, as described with respect to FIGS. 1-3D, electric vehicle 308B is assigned to charge at the power dispenser 304B of chain 306A.

In some embodiments, the method 500 comprises facilitating, via communication with a second power dispenser of the first chain, initiation of a charging session with a third vehicle after the first vehicle completes charging. For example, as described with respect to FIGS. 1-3D, after the power dispenser 304A finishes charging the electric vehicle 308A, the vehicle charging system 100/200/300, server 220, and/or electronic device 230 facilitates initiation of a charging session with electric vehicle 308B via communication with power dispenser 304B.

In some embodiments, the method 500 comprises assigning the third vehicle to charge at a last available power dispenser of the first chain of power dispensers, and assigning the fourth vehicle to charge at a last available power dispenser of the second chain of power dispensers. For example, as described with respect to FIGS. 1-3D, the vehicles with the lowest demands are assigned to the last power dispensers of a respective chain, these vehicles with the lowest demands are charged last. For example, the vehicle having a demand of 15.3 kWh is charged by a last power dispenser (e.g., power dispenser 104D) of the first chain (e.g., chain 106A). This vehicle is the last vehicle of the first chain to charge. As another example, the vehicle having a demand of 13 kWh is charged by a last power dispenser (e.g., power dispenser 104H) of the second chain (e.g., chain 106B). This vehicle is the last vehicle of the second chain to charge.

In some embodiments, the method 500 comprises receiving an updated vehicle status information of a third vehicle, and in response to receiving the updated vehicle status information, determining, based on the updated vehicle status information, an updated first set of demands and an updated second set of demands. For example, as described with respect to FIGS. 1-3D, an updated vehicle status information from an electric vehicle is received (e.g., by the vehicle charging system 100, by the server 220, by the electronic device 230), and in response to receiving the updated vehicle status information, updated set of demands are determined (e.g., by the vehicle charging system 100, by the server 220, by the electronic device 230) based on the updated vehicle status information. As an example, the sets of demands or some sets of demands (e.g., some vehicles may be charging when the updated demand is received, so some vehicles may not be reassigned) are re-determined based on the updated vehicle status information, using the methods described herein. As yet another example, a set of demands corresponding to the updated vehicle status information may be updated (e.g., the set is reordered based on the updated demand). Power dispenser assignments determined based on the updated set of demands may be transmitted (e.g., to other vehicles affected by the reassignments).

In some embodiments, prior to receiving the updated vehicle status information of the third vehicle, the third vehicle was assigned to charge at a third power dispenser, and the method 500 comprises in accordance with the determination of the updated first set and the updated second set of demands, assigning the third vehicle to a fourth power dispenser, different from the third power dispenser. For example, the vehicle was assigned to charge at the power dispenser 104B. Based on an updated vehicle status information from the vehicle, the sets of demands are updated (e.g., as described above), and based on the updated vehicle status information, the vehicle is assigned to charge at a different power dispenser (e.g., the vehicle may be assigned closer to the front of the chain if the corresponding updated demand is higher, the vehicle may be assigned farther from the front of the chain if the corresponding updated demand is lower). Power dispenser assignments determined based on the updated set of demands may be transmitted (e.g., to other vehicles affected by the reassignments).

In some embodiments, the method 500 comprises receiving vehicle status information from a third vehicle that does not belong to the plurality of electric vehicles, and in response to receiving the vehicle status information from the third vehicle, determining, based on the vehicle status information from the third vehicle, an updated first set of demands and an updated second set of demands. For example, as described with respect to FIGS. 1-3D, a vehicle is added to the plurality of electric vehicles to be charged (e.g., after the sets of demands are determined), and vehicle status information from the added vehicle (e.g., a vehicle that does not belong to the plurality of electric vehicles associated with the previously determined set of demands) is received. In response to receiving the vehicle status information from the added vehicle, updated sets of demands, based on the vehicle status information from the added vehicle, is determined (e.g., by the vehicle charging system 100, by the server 220, by the electronic device 230, as described above). Power dispenser assignments determined based on the updated set of demands may be transmitted. In some embodiments, in accordance with a determination that the vehicle cannot be charged by the power dispensers (e.g., all power dispensers have been assigned), determination of the updated sets of demand is forgone. An indication or instruction to charge at different power dispensers or to charge at the power dispensers at a different time may be transmitted.

In some embodiments, the method 500 comprises receiving an indication or instruction to remove a demand of a third vehicle of the plurality of electric vehicles, and in response to receiving the indication or instruction, determining, based on the removal of the demand of the third vehicle, an updated first set of demands and an updated second set of demands. For example, as described with respect to FIGS. 1-3D, a vehicle is removed from the plurality of electric vehicles to be charged (e.g., after the sets of demands are determined). In some embodiments, an indication or instruction to remove a demand of a vehicle (e.g., a vehicle that had a previous assignment) is received. In response to receiving the indication or instruction to remove the demand of the vehicle, updated sets of demands based on the removed vehicle is determined. Power dispenser assignments determined based on the updated set of demands may be transmitted.

In some embodiments, the method 500 comprises providing for display information indicating the assignment of the first vehicle to the first power dispenser of the first chain and the assignment of the second vehicle to the first power dispenser of the second chain. For example, as described with respect to FIGS. 1-3D, the vehicle charging system 100/200/300 and/or the server 220 provide display information indicating the assignment of the first vehicle to the first power dispenser of the first chain and the assignment of the second vehicle to the first power dispenser of the second chain (e.g., to the electronic device 230).

In some embodiments, the method 500 comprises providing for display information related to charging of the first and second electric vehicles. For example, as described with respect to FIGS. 1-3D, the vehicle charging system 100/200/300 and/or the server 220 electronic device 230 are configured to provide display information display information about the vehicles' charging status after they are assigned to their respective power dispensers (e.g., to the electronic device 230).

Although the examples are described with respect to chains of chargers, it is appreciated that the disclosed vehicle charging system may include chargers that are not organized in chains, and by performing the disclosed methods (e.g., taking account of the sequential nature of the chains may be forgone, demands may not be organized in sets, demands are organized into one set such that an index of the organized set corresponds to a charger), the electric vehicles would be optimally charged by the vehicle charging system described herein. For example, the vehicle charging system comprises a plurality of chargers that are configured for different power outputs (e.g., between 6 kW to 350 kW), and the operations described herein advantageously allow an appropriate charger to charge an electric vehicle (e.g., a charger configured for a lower power output charges an electric vehicle having a lower demand) based on the vehicle's demand (e.g., allowing the electric vehicles to return to operation on schedule and minimize energy costs).

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for charging an electric vehicle fleet including the particular steps of the method of FIG. 5, this disclosure contemplates any suitable method for charging an electric vehicle fleet including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
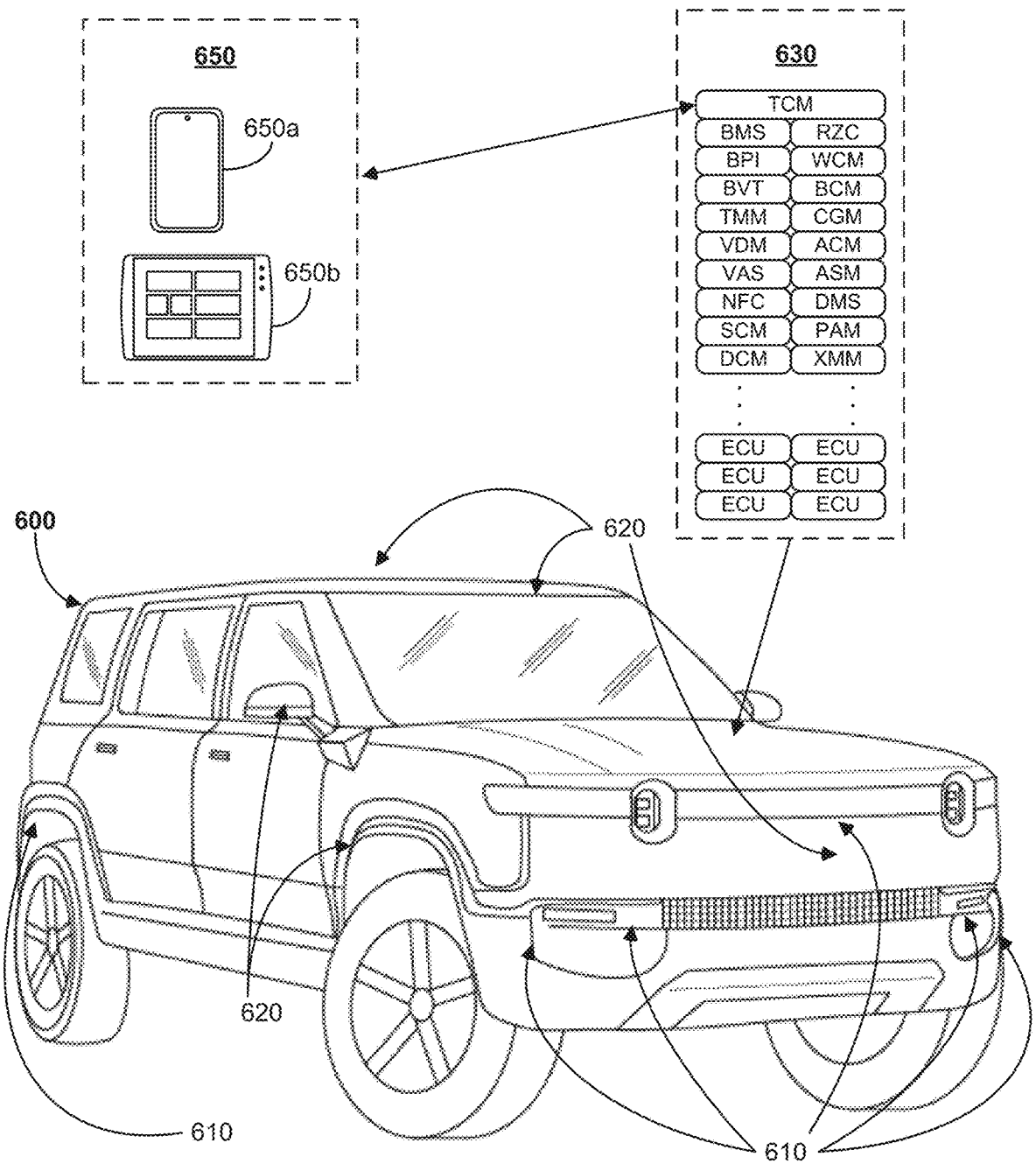
FIG. 6 illustrates an example vehicle.

FIG. 6 illustrates an example vehicle 600. One or more of vehicles 308A-308L may be vehicle 600. Vehicle 600 may include multiple sensors 610, multiple cameras 620, and a control system 630. In some embodiments, vehicle 600 may be able to pair with a computing device 650 (e.g., smartphone 650a, tablet computing device 650b, or a smart vehicle accessory). As an example and not by way of limitation, a sensor 610 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 620 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 600 may include various controllable components (e.g., doors, seats, windows, lights, HVAC, entertainment system, security system), instrument and information displays and/or interactive interfaces, functionality to pair a computing device 650 with the vehicle (which may enable control of certain vehicle functions using the computing device 650), and functionality to pair accessories with the vehicle, which may then be controllable through an interactive interface in the vehicle or through a paired computing device 650.

Control system 630 may enables control of various systems on-board the vehicle. As shown in FIG. 6, control system 630 may comprise one or more electronic control units (ECUs), each of which are dedicated to a specific set of functions. Each ECU may be a computer system (as described further in FIG. 8), and each ECU may include functionality provide by one or more of the example ECUs described below.

Features of embodiments as described herein may be controlled by one or more ECUs that provide functionality related to the battery pack of the vehicle. A Battery Management System (BMS) ECU may control and monitor a number of different aspects related to the electric vehicle battery system. Functions that may be controlled by the BMS may include, by way of example and not limitation, controlling the battery pack contactors and pre-charge relay, monitoring the high voltage connector, measuring the pack puncture sensor resistance and pack water sensor resistance, controlling the battery pack fans, measuring busbar temperature, communicating with the BPI and BVT ECUs, and calculate state-of-charge (SoC) and battery state-of-health (SoH). A Battery Power Isolation (BPI) ECU may provide high-voltage sensing, measure the battery pack current, and facilitate determination of pack isolation. A Balancing Voltage Temperature (BVT) ECU may monitor battery module cell voltages, monitor temperature, and execute cell balancing. The BMS ECU may provide a portion of the vehicle status information for determining the vehicle's demand. The BMS ECU or another ECU of the vehicle 600 may determine the vehicle's demand based on the status information.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication. The VAS ECU may provide access of the vehicle's charging port to a power dispenser.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 650, in-vehicle navigation, vehicle-to-vehicle communication, communication between the vehicle and landscape features (e.g., automated toll road sensors, automated toll gates, power dispensers at charging stations), or automated calling functionality. The vehicle may communicate with a power dispenser, another electronic device (that installed a software for performing the steps described herein), or a server (for performing the steps described herein) via the TCM ECU.

Features of embodiments as described herein may be controlled by one or more ECUs may provide functions of an automated driving system (ADS) and/or an advanced driver assistance system (ADAS) that may be enabled by a driver of the vehicle to provide one or more functions to support driving assistance and/or automation. An Autonomy Control Module (ACM) ECU may process data captured by cameras 620 and/or sensors 610. In some embodiments, the ACM ECU may provide artificial intelligence functionality to provide and/or refine functions to support driving assistance and/or automation. An Autonomous Safety Module (ASM) ECU may provide functions to support driving safety by monitoring sensors that support self-driving functions. A Driver Monitoring System (DMS) ECU may provide functionality to monitor and inform the control system about the driver's level of attention (e.g., while relying on driving assistance and/or automation functions). The DMS may process data captured by a camera positioned to monitor the driver's gaze. A Park Assist Module (PAM) ECU may provide functions to assist a driver during manual and/or automated parking operations. The PAM ECU may process data captured by cameras 620 and/or sensors 610 in order to determine appropriate control commands. The ADS and/or the ADAS may cause the vehicle to travel autonomously to an assigned power dispenser, as described above.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 630. The XMM ECU may generate a user interface for communicating power dispenser assignment and vehicle status information for determining vehicle demand.

Vehicle 600 may include one or more additional ECUs, such as, by way of example and not limitation: a Telematics Control Module (TCM) ECU, an Experience Management Module (XMM) ECU, a Vehicle Access System (VAS) ECU, a Near-Field Communication (NFC) ECU, an Autonomy Control Module (ACM) ECU, an Autonomous Safety Module (ASM) ECU, and/or a Driver Monitoring System (DMS) ECU. If vehicle 600 is an electric vehicle, one or more ECUs may provide functionality related to the battery pack of the vehicle, such as a Battery Management System (BMS) ECU and/or a Battery Power Isolation (BPI) ECU.

Figure 7:
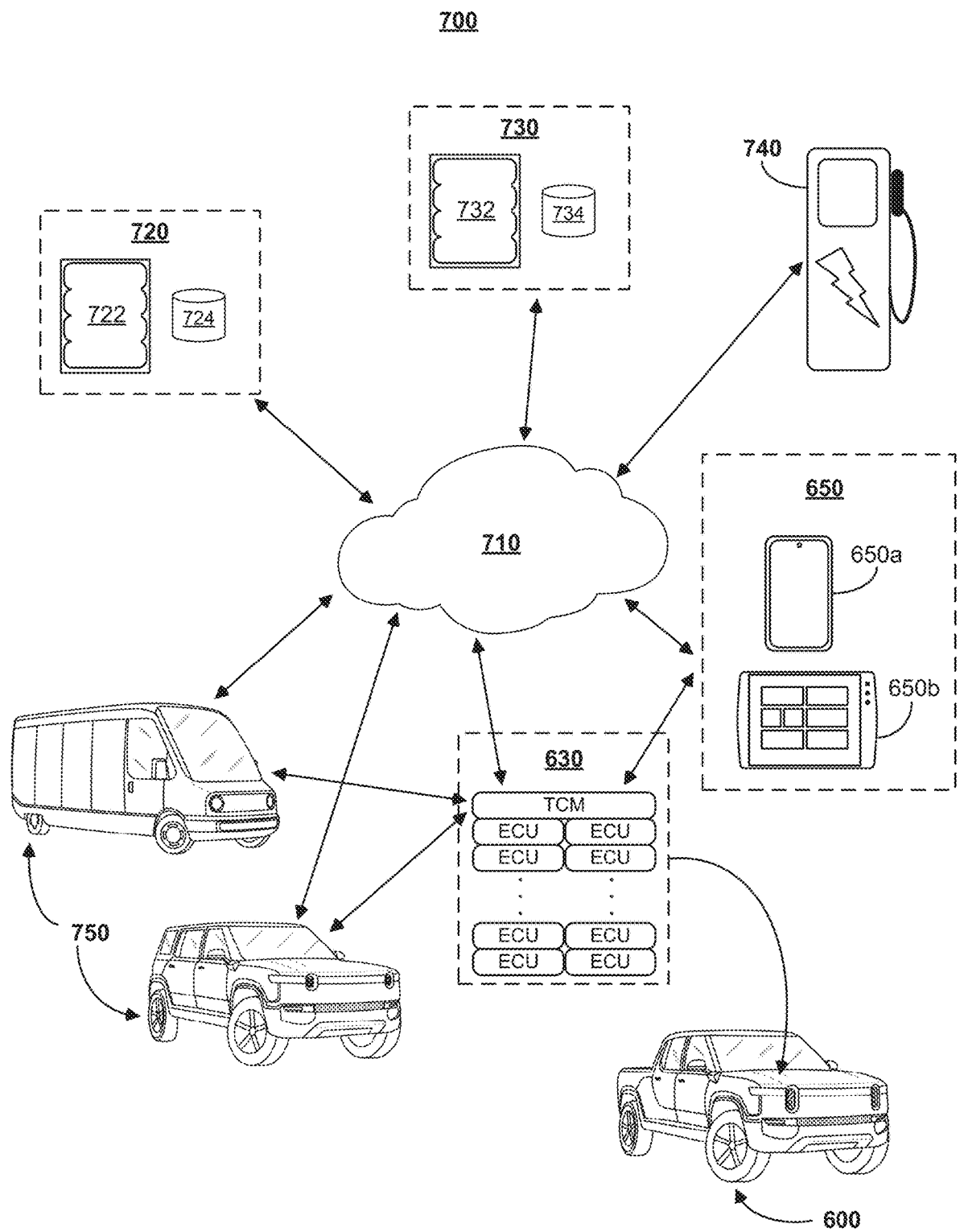
FIG. 7 illustrates an example network system including a connected vehicle.

FIG. 7 illustrates an example networked environment 700. Computer system 700 may include a connected vehicle 600 with a control system 630 that is capable of transmitting data to/from a network 710. For example, the data comprise vehicle status information, demand of a vehicle, power dispenser assignment information, and/or information facilitating initiation of an electric vehicle charging session. Network 710 may also be connected to one or more computing servers 720 (e.g., including compute units 722 and storage units 724) associated with a vehicle manufacturer, a vehicle service provider, a vehicle fleet operator, or a vehicle-charging facility provider. Network 710 may also be connected to one or more third-party computing servers 730 (e.g., including compute units 732 and storage units 734) associated with, for example, a vehicle fleet management organization (e.g., delivery service), an autonomous vehicle management organization (e.g., autonomous or semi-autonomous delivery service), a smart accessory manufacturer, a group event organizer, service provider, or a governmental organization. Networked environment 700 may include one or more landscape features 740 (e.g., automated toll road sensors, smart road signs or road markers, automated toll gates, power dispensers at charging stations). Networked environment 700 may also include other connected vehicles 750 that may be capable of communicating with vehicle 600 through network 710 and/or directly with vehicle 600 (e.g., by communicating with a TCM ECU of a control system 630 of vehicle 600 when connected vehicle 750 is within range of a short-range communications network, such as Bluetooth). Networked environment 700 may also include one or more computing devices 650 (e.g., smartphone 650*a*, a tablet computing device 650*b*, or a smart vehicle accessory) capable of communicating with network 710 and/or directly with vehicle 600.

Networked environment 700 may enable transmission of data and communications between any of the depicted elements. In some embodiments, such information may be communicated in one direction (e.g., a smart road sign broadcasting information related to traffic control or delays due to construction); in other embodiments, information may include two-way communications (e.g., an automated toll gate that processes a request received from vehicle 600 to deduct a toll from a specified account and provides confirmation of the transaction). In particular embodiments, one or more elements of networked environment 700 may include one or more computer systems, as described in further detail with respect to FIG. 8A. In particular embodiments, one or more elements of networked environment 700 perform one or more steps of one or more methods described or illustrated herein. In particular embodiments, software running on one or more elements of networked environment 700 may be controlled by a single entity (e.g., a vehicle fleet management organization) to perform one or more steps of one or more methods described or illustrated herein or provide functionality described or illustrated herein. In particular embodiments, software running on one or more elements of networked environment 700 may be controlled by two or more entities (e.g., a vehicle fleet operation organization, a vehicle fleet manufacturer providing support) to perform one or more steps of one or more methods described or illustrated herein or provide functionality described or illustrated herein.

FIG. 8A illustrates an example computer system 800. The computer system 800 may perform the steps disclosed herein, such as determining vehicle demand, determining power dispenser assignment, and facilitating initiation of electric vehicle charging session. Computer system 800 may include a processor 802, memory 804, storage 806, an input/output (I/O) interface 808, a communication interface 810, and a bus 812. Although this disclosure describes one example computer system including specified components in a particular arrangement, this disclosure contemplates any suitable computer system with any suitable number of any suitable components in any suitable arrangement. As an example and not by way of limitation, computer system 800 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 800 may include one or more computer systems 800; be unitary or distributed, span multiple locations, machines, or data centers; or reside in a cloud, which may include one or more cloud components in one or more networks. Where appropriate, computer system(s) 800 may perform, at different times or at different locations, in real time or in batch mode, one or more steps of one or more methods described or illustrated herein.

Processor 802 (e.g., compute units 722 and 732) may include hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806 (e.g., storage units 724 and 734). Processor 802 may include one or more internal caches for data, instructions, or addresses.

In particular embodiments, memory 804 includes main memory for storing instructions for processor 802 to execute or data for processor 802 to operate on. In particular embodiments, one or more memory management units (MMUs) reside between processor 802 and memory 804 and facilitate accesses to memory 804 requested by processor 802. In particular embodiments, memory 804 includes random access memory (RAM). This disclosure contemplates any suitable RAM.

In particular embodiments, storage 806 includes mass storage for data or instructions. As an example and not by way of limitation, storage 806 may include a removable disk drive, flash memory, an optical disc, a magneto-optical disc, magnetic tape, or a Universal Serial Bus (USB) drive or two or more of these. Storage 806 may include removable or fixed media and may be internal or external to computer system 800. Storage 806 may include any suitable form of non-volatile, solid-state memory or read-only memory (ROM).

In particular embodiments, I/O interface 808 includes hardware, software, or both, providing one or more interfaces for communication between computer system 800 and one or more input and/or output (I/O) devices. Computer system 800 may be communicably connected to one or more of these I/O devices, which may be incorporated into, plugged into, paired with, or otherwise communicably connected to vehicle 600 (e.g., through the TCM ECU). An input device may include any suitable device for converting volitional user input into digital signals that can be processed by computer system 800, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 610 described above. An output device may include devices designed to receive digital signals from computer system 800 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 808 for them. I/O interface 808 may include one or more I/O interfaces 808, where appropriate.

In particular embodiments, communication interface 810 includes hardware, software, or both providing one or more interfaces for data communication between computer system 800 and one or more other computer systems 800 or one or more networks. Communication interface 810 may include one or more interfaces to a controller area network (CAN) or to a local interconnect network (LIN). Communication interface 810 may include one or more of a serial peripheral interface (SPI) or an isolated serial peripheral interface (isoSPI). In some embodiments, communication interface 810 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 812 includes hardware, software, or both coupling components of computer system 800 to each other. Bus 812 may include any suitable bus, as well as one or more buses 812, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 8B illustrates example firmware 850 for a vehicle ECU 800 as described with respect to control system 630. The firmware 850 may include functions for performing the steps disclosed herein, such as determining vehicle demand, determining power dispenser assignment, and facilitating initiation of electric vehicle charging session. Firmware 850 may include functions 852 for analyzing sensor data based on signals received from sensors 610 or cameras 620 received through communication interface 810. Firmware 850 may include functions 854 for processing user input (e.g., directly provided by a driver of or passenger in vehicle 600, or provided through a computing device 650) received through I/O interface 808. Firmware 850 may include functions 856 for logging detected events (which may be stored in storage 806 or uploaded to the cloud), as well as functions for reporting detected events (e.g., to a driver or passenger of the vehicle through an instrument display or interactive interface of the vehicle, or to a vehicle manufacturer, service provider, or third party through communication interface 810). Firmware 850 may include functions 858 for assessing safety parameters (e.g., monitoring the temperature of a vehicle battery or the distance between vehicle 600 and nearby vehicles). Firmware 850 may include functions 860 for transmitting control signals to components of vehicle 600, including other vehicle ECUs 800.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In some embodiments, a method for charging electric vehicles, comprises: receiving vehicle status information from a plurality of electric vehicles, wherein the vehicle status information includes a current state of charge for each of the plurality of electric vehicles; determining, from the vehicle status information, demands of the plurality of electric vehicles, wherein each demand represents a specified quantity of electric energy to charge one or more batteries of a corresponding one of the electric vehicles; determining, from the demands of the plurality of electric vehicles, a first set of demands and a second set of demands, wherein: the first set comprises a demand of a first vehicle having the highest demand of the first set, and the second set comprises a demand of a second vehicle having the highest demand of the second set; based on the first set of demands and the second set of demands: assigning the first vehicle to charge at a first power dispenser of a first chain of power dispensers, wherein the first power dispenser of the first chain is configured for a highest charging output of the first chain; assigning the second vehicle to charge at a first power dispenser of a second chain of power dispensers, wherein the first power dispenser of the second chain is configured for a highest charging output of the second chain; facilitating, via communication with the first power dispenser of the first chain, initiation of a first charging session with the first vehicle; and facilitating, via communication with the first power dispenser of the second chain, initiation of a second charging session with the second vehicle.

In some embodiments, the method further comprises assigning a third vehicle to charge at a second power dispenser of the first chain of power dispensers, wherein the first set comprises a demand of the third vehicle, and wherein the demand of the third vehicle is less than the demand of the first vehicle.

In some embodiments, the method further comprises facilitating, via communication with a second power dispenser of the first chain, initiation of a charging session with a third vehicle after the first vehicle completes charging.

In some embodiments, the first chain, the second chain, or the first and second chains comprise a direct current (DC) electric vehicle charger.

In some embodiments, the first chain, the second chain, or the first and second chains comprise an alternate current (AC) electric vehicle charger.

In some embodiments, the first set comprises a demand of a third vehicle, the second set comprises a demand of a fourth vehicle, and the demand of the third vehicle and the demand of the fourth vehicle are the lowest and second lowest demand of the demands of the plurality of electric vehicles.

In some embodiments, the method further comprises: assigning the third vehicle to charge at a last available power dispenser of the first chain of power dispensers; and assigning the fourth vehicle to charge at a last available power dispenser of the second chain of power dispensers.

In some embodiments, the vehicle status information further includes a priority of the request for the specified quantity of electric energy.

In some embodiments, the first set of demands and the second set of demands are determined further based on available energy outputs of the first chain and the second chain of power dispensers.

In some embodiments, the first set and the second set of demands are determined further based on a deadline for charging the plurality of electric vehicles.

In some embodiments, the vehicle status information further includes a condition of the one or more batteries of the corresponding one of the electric vehicles.

In some embodiments, the method further comprises: receiving an updated vehicle status information from a third vehicle; and in response to receiving the updated vehicle status information, determining, based on the updated vehicle status information, an updated first set of demands and an updated second set of demands.

In some embodiments, prior to receiving the updated vehicle status information from the third vehicle, the third vehicle was assigned to charge at a third power dispenser, and the method further comprises in accordance with the determination of the updated first set and the updated second set of demands, assigning the third vehicle to a fourth power dispenser, different from the third power dispenser.

In some embodiments, the method further comprises providing for display information indicating the assignment of the first vehicle to the first power dispenser of the first chain and the assignment of the second vehicle to the first power dispenser of the second chain.

In some embodiments, the method further comprises: receiving vehicle status information from a third vehicle that does not belong to the plurality of electric vehicles; and in response to receiving the vehicle status information from the third vehicle, determining, based on the vehicle status information from the third vehicle, an updated first set of demands and an updated second set of demands.

In some embodiments, the method further comprises: receiving an indication or instruction to remove a demand of a third vehicle of the plurality of electric vehicles; and in response to receiving the indication or instruction, determining, based on the removal of the demand of the third vehicle, an updated first set of demands and an updated second set of demands.

In some embodiments, a difference between a sum of the first set and a sum of the second set is within a threshold value.

In some embodiments, the method further comprises: determining whether the first vehicle is electrically coupled to the first power dispenser of the first chain; in accordance with a determination that the first vehicle is electrically coupled to the first power dispenser of the first chain, initiating the first charging session with the first vehicle; and in accordance with a determination that the first vehicle is not electrically coupled to the first power dispenser of the first chain, forgoing initiating the first charging session with the first vehicle.

In some embodiments, a system for charging electric vehicles comprises: a first chain of power dispensers comprising a first power dispenser; a second chain of power dispensers comprising a second power dispenser; and one or more processors configured to cause the system to perform a method comprising: receiving vehicle status information from a plurality of electric vehicles, wherein the vehicle status information includes a current state of charge for each of the plurality of electric vehicles; determining, from the vehicle status information, demands of the plurality of electric vehicles, wherein each demand represents a specified quantity of electric energy to charge one or more batteries of a corresponding one of the electric vehicles; determining, from the demands of the plurality of electric vehicles, a first set of demands and a second set of demands, wherein: the first set comprises a demand of a first vehicle having the highest demand of the first set, and the second set comprises a demand of a second vehicle having the highest demand of the second set; based on the first set of demands and the second set of demands: assigning the first vehicle to charge at a first power dispenser of a first chain of power dispensers, wherein the first power dispenser of the first chain is configured for a highest charging output of the first chain; assigning the second vehicle to charge at a first power dispenser of a second chain of power dispensers, wherein the first power dispenser of the second chain is configured for a highest charging output of the second chain; facilitating, via communication with the first power dispenser of the first chain, initiation of a first charging session with the first vehicle; and facilitating, via communication with the first power dispenser of the second chain, initiation of a second charging session with the second vehicle.

In some embodiments, a non-transitory computer readable storage medium storing one or more programs, the one or more programs comprising instructions, which when executed by a system with one or more processors and memory, cause the system to perform a method comprising: receiving vehicle status information from a plurality of electric vehicles, wherein the vehicle status information includes a current state of charge for each of the plurality of electric vehicles; determining, from the vehicle status information, demands of the plurality of electric vehicles, wherein each demand represents a specified quantity of electric energy to charge one or more batteries of a corresponding one of the electric vehicles; determining, from the demands of the plurality of electric vehicles, a first set of demands and a second set of demands, wherein: the first set comprises a demand of a first vehicle having the highest demand of the first set, and the second set comprises a demand of a second vehicle having the highest demand of the second set; based on the first set of demands and the second set of demands: assigning the first vehicle to charge at a first power dispenser of a first chain of power dispensers, wherein the first power dispenser of the first chain is configured for a highest charging output of the first chain; assigning the second vehicle to charge at a first power dispenser of a second chain of power dispensers, wherein the first power dispenser of the second chain is configured for a highest charging output of the second chain; facilitating, via communication with the first power dispenser of the first chain, initiation of a first charging session with the first vehicle; and facilitating, via communication with the first power dispenser of the second chain, initiation of a second charging session with the second vehicle.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method for charging electric vehicles, comprising:
receiving vehicle status information from a plurality of electric vehicles, wherein the vehicle status information includes a current state of charge for each of the plurality of electric vehicles;
determining, from the vehicle status information, demands of the plurality of electric vehicles, wherein each demand represents a specified quantity of electric energy to charge one or more batteries of a corresponding one of the electric vehicles;
determining, from the demands of the plurality of electric vehicles, a first set of demands and a second set of demands, wherein:
the first set comprises a demand of a first vehicle having the highest demand of the first set, and
the second set comprises a demand of a second vehicle having the highest demand of the second set;
based on the first set of demands and the second set of demands:
assigning the first vehicle to charge at a first power dispenser of a first chain of power dispensers, wherein the first power dispenser of the first chain is configured for a highest charging output of the first chain;
assigning the second vehicle to charge at a first power dispenser of a second chain of power dispensers, wherein the first power dispenser of the second chain is configured for a highest charging output of the second chain;
facilitating, via communication with the first power dispenser of the first chain, initiation of a first charging session with the first vehicle;
facilitating, via communication with the first power dispenser of the second chain, initiation of a second charging session with the second vehicle; and
providing for display information indicating the assignment of the first vehicle to the first power dispenser of the first chain and the assignment of the second vehicle to the first power dispenser of the second chain.

2. The method of claim 1, further comprising assigning a third vehicle to charge at a second power dispenser of the first chain of power dispensers, wherein the first set comprises a demand of the third vehicle, and wherein the demand of the third vehicle is less than the demand of the first vehicle.

3. The method of claim 1, further comprising facilitating, via communication with a second power dispenser of the first chain, initiation of a charging session with a third vehicle after the first vehicle completes charging.

4. The method of claim 1, wherein the first chain, the second chain, or the first and second chains comprise a direct current (DC) electric vehicle charger.

5. The method of claim 1, wherein the first chain, the second chain, or the first and second chains comprise an alternate current (AC) electric vehicle charger.

6. The method of claim 1, wherein:
the first set comprises a demand of a third vehicle,
the second set comprises a demand of a fourth vehicle, and
the demand of the third vehicle and the demand of the fourth vehicle are the lowest and second lowest demand of the demands of the plurality of electric vehicles.

7. The method of claim 6, further comprising:
assigning the third vehicle to charge at a last available power dispenser of the first chain of power dispensers; and
assigning the fourth vehicle to charge at a last available power dispenser of the second chain of power dispensers.

8. The method of claim 1, wherein the vehicle status information further includes a priority of the request for the specified quantity of electric energy.

9. The method of claim 1, wherein the first set of demands and the second set of demands are determined further based on available energy outputs of the first chain and the second chain of power dispensers.

10. The method of claim 1, wherein the first set and the second set of demands are determined further based on a deadline for charging the plurality of electric vehicles.

11. The method of claim 1, wherein the vehicle status information further includes a condition of the one or more batteries of the corresponding one of the electric vehicles.

12. The method of claim 1, further comprising:
receiving an updated vehicle status information from a third vehicle; and
in response to receiving the updated vehicle status information, determining, based on the updated vehicle status information, an updated first set of demands and an updated second set of demands.

13. The method of claim 12, wherein:
prior to receiving the updated vehicle status information from the third vehicle, the third vehicle was assigned to charge at a third power dispenser, and
the method further comprises in accordance with the determination of the updated first set and the updated second set of demands, assigning the third vehicle to a fourth power dispenser, different from the third power dispenser.

14. The method of claim 1, further comprising:
receiving vehicle status information from a third vehicle that does not belong to the plurality of electric vehicles; and
in response to receiving the vehicle status information from the third vehicle, determining, based on the vehicle status information from the third vehicle, an updated first set of demands and an updated second set of demands.

15. The method of claim 1, further comprising:
receiving an indication or instruction to remove a demand of a third vehicle of the plurality of electric vehicles; and
in response to receiving the indication or instruction, determining, based on the removal of the demand of the third vehicle, an updated first set of demands and an updated second set of demands.

16. The method of claim 1, wherein a difference between a sum of the first set and a sum of the second set is within a threshold value.

17. The method of claim 1, further comprising:
determining whether the first vehicle is electrically coupled to the first power dispenser of the first chain;
in accordance with a determination that the first vehicle is electrically coupled to the first power dispenser of the first chain, initiating the first charging session with the first vehicle; and
in accordance with a determination that the first vehicle is not electrically coupled to the first power dispenser of the first chain, forgoing initiating the first charging session with the first vehicle.

18. A system for charging electric vehicles, comprising:
a first chain of power dispensers comprising a first power dispenser;
a second chain of power dispensers comprising a second power dispenser; and
one or more processors configured to cause the system to perform a method comprising:
receiving vehicle status information from a plurality of electric vehicles, wherein the vehicle status information includes a current state of charge for each of the plurality of electric vehicles;
determining, from the vehicle status information, demands of the plurality of electric vehicles, wherein each demand represents a specified quantity of electric energy to charge one or more batteries of a corresponding one of the electric vehicles;
determining, from the demands of the plurality of electric vehicles, a first set of demands and a second set of demands, wherein:
the first set comprises a demand of a first vehicle having the highest demand of the first set, and
the second set comprises a demand of a second vehicle having the highest demand of the second set;
based on the first set of demands and the second set of demands:
assigning the first vehicle to charge at a first power dispenser of a first chain of power dispensers, wherein the first power dispenser of the first chain is configured for a highest charging output of the first chain;
assigning the second vehicle to charge at a first power dispenser of a second chain of power dispensers, wherein the first power dispenser of the second chain is configured for a highest charging output of the second chain;
facilitating, via communication with the first power dispenser of the first chain, initiation of a first charging session with the first vehicle;
facilitating, via communication with the first power dispenser of the second chain, initiation of a second charging session with the second vehicle; and
providing for display information indicating the assignment of the first vehicle to the first power dispenser of the first chain and the assignment of the second vehicle to the first power dispenser of the second chain.

19. A non-transitory computer readable storage medium storing one or more programs, the one or more programs comprising instructions, which when executed by a system with one or more processors and memory, cause the system to perform a method comprising:
receiving vehicle status information from a plurality of electric vehicles, wherein the vehicle status information includes a current state of charge for each of the plurality of electric vehicles;
determining, from the vehicle status information, demands of the plurality of electric vehicles, wherein each demand represents a specified quantity of electric energy to charge one or more batteries of a corresponding one of the electric vehicles;
determining, from the demands of the plurality of electric vehicles, a first set of demands and a second set of demands, wherein:
the first set comprises a demand of a first vehicle having the highest demand of the first set, and
the second set comprises a demand of a second vehicle having the highest demand of the second set;
based on the first set of demands and the second set of demands:
assigning the first vehicle to charge at a first power dispenser of a first chain of power dispensers, wherein the first power dispenser of the first chain is configured for a highest charging output of the first chain;
assigning the second vehicle to charge at a first power dispenser of a second chain of power dispensers, wherein the first power dispenser of the second chain is configured for a highest charging output of the second chain;
facilitating, via communication with the first power dispenser of the first chain, initiation of a first charging session with the first vehicle;

facilitating, via communication with the first power dispenser of the second chain, initiation of a second charging session with the second vehicle; and providing for display information indicating the assignment of the first vehicle to the first power dispenser of the first chain and the assignment of the second vehicle to the first power dispenser of the second chain.

* * * * *